US007826597B2

(12) United States Patent
Berner et al.

(10) Patent No.: US 7,826,597 B2
(45) Date of Patent: Nov. 2, 2010

(54) METHODS AND APPARATUS TO HANDLE CUSTOMER SUPPORT REQUESTS

(75) Inventors: Earl A. Berner, Wylie, TX (US);
Kristina Robinson, San Antonio, TX (US); Mark Magnusson, Mount Prospect, IL (US); Jason Porter, Frisco, TX (US); James Rushing, McKinney, TX (US); Mark Welch, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1209 days.

(21) Appl. No.: 11/298,001

(22) Filed: Dec. 9, 2005

(65) Prior Publication Data
US 2007/0133780 A1 Jun. 14, 2007

(51) Int. Cl.
*H04M 1/24* (2006.01)
*H04M 3/08* (2006.01)

(52) U.S. Cl. .................. 379/1.01; 379/9; 379/10.01; 379/10.02; 379/10.03

(58) Field of Classification Search ............ 379/265.01, 379/265.02, 1.01, 9, 9.01–9.03, 10.01, 10.03, 379/15.01, 22.07, 26.02, 27.04, 29.02, 32.04; 370/242; 714/25, 26, 57
See application file for complete search history.

(56) References Cited

U.S. PATENT DOCUMENTS

| | | | |
|---|---|---|---|
| 4,972,453 A * | 11/1990 | Daniel et al. ............... 379/9.03 |
| 5,737,726 A | 4/1998 | Cameron et al. | |
| 6,298,459 B1 | 10/2001 | Tsukamoto | |
| 6,332,154 B2 * | 12/2001 | Beck et al. ................... 709/204 |
| 6,345,250 B1 * | 2/2002 | Martin ........................ 704/260 |
| 6,487,277 B2 * | 11/2002 | Beyda et al. ............. 379/88.01 |
| 6,542,601 B1 | 4/2003 | Hernandez et al. | |
| 6,581,067 B1 | 6/2003 | Bjergo et al. | |
| 6,615,240 B1 | 9/2003 | Sullivan et al. | |
| 6,671,824 B1 * | 12/2003 | Hyland et al. .................. 714/26 |
| 6,889,339 B1 * | 5/2005 | D'Amico et al. ............... 714/4 |
| 7,106,834 B2 * | 9/2006 | Macdonald et al. ........ 379/1.04 |
| 7,349,345 B1 * | 3/2008 | Hansen et al. ............... 370/242 |
| 2002/0111950 A1 | 8/2002 | Lee | |
| 2002/0122050 A1 | 9/2002 | Sandberg | |
| 2002/0194047 A1 | 12/2002 | Edinger et al. | |
| 2004/0109555 A1 * | 6/2004 | Williams ................ 379/265.02 |
| 2005/0149418 A1 * | 7/2005 | Erbey et al. .................... 705/35 |
| 2006/0285657 A1 * | 12/2006 | Lippke et al. ............... 379/67.1 |

* cited by examiner

*Primary Examiner*—Quynh H Nguyen
*Assistant Examiner*—Oleg Asanbayev
(74) *Attorney, Agent, or Firm*—Hanley, Flight & Zimmerman, LLC.

(57) ABSTRACT

Methods and apparatus to handle support contacts in a call center are disclosed. An example method for handling a first contact to a support center includes receiving the first contact from a first person, receiving a first identifier associated with the first person, analyzing contact details for a second contact associated with a second identifier associated with a second person different from the first person to determine if a problem associated with the first identifier exists, and indicating that a problem associated with the first identifier exists if the contact details for the second contact associated with the second identifier indicate that a problem associated with the first identifier exists.

28 Claims, 33 Drawing Sheets

METHODS AND APPARATUS TO HANDLE CUSTOMER SUPPORT REQUESTS

FIELD OF THE DISCLOSURE

This disclosure relates generally to telecommunication systems, and, more particularly, to telecommunications systems for handling customer support requests.

BACKGROUND

As consumer products and services have grown more complex, the need to provide support to consumers purchasing these products and services has grown. Traditionally, this support has been provided by live agents over the telephone. A call center is a central location where multiple agents answer telephone calls from consumers looking for support. A business may have several call centers. In addition, a business may hire a company that provides call center services for many business.

Businesses that wish to maintain a call center evaluate the number of calls that will be handled simultaneously in order to determine the number of agents that must be available. To maintain quality, businesses do not want to have customers waiting on hold for extended periods of time. To maintain efficiency, businesses do not want to have agents waiting for calls because maintaining many agents is expensive. Accordingly, it is desirable for a business to reduce the number of agents that are necessary for the call center.

One method for reducing the number of call center agents, is the use of an interactive voice response (IVR) server. An IVR server is often used to answer calls to a call center. The IVR server uses text-to-speech methods to provide an initial interaction with a customer calling the call center. The IVR server is able to gather information about the identity of the customer. In addition, the IVR server can ask the customer which department of the call center they are attempting to contact. The IVR server can then route the call to an agent of the desired department. IVR servers have typically been limited to gathering information and providing simple instructions to customers.

DETAILED DESCRIPTION

Methods and apparatus for handling calls or other communication (e.g., data communication) from customers are described below. In particular, as described below, the methods and apparatus may receive communication, identify the source of the communication and the information associated with the source of the communication. This information, along with information as to the status of the network and the various pieces of hardware in the network, may be used to enhance caller satisfaction and reduce service time.

Figure 1:
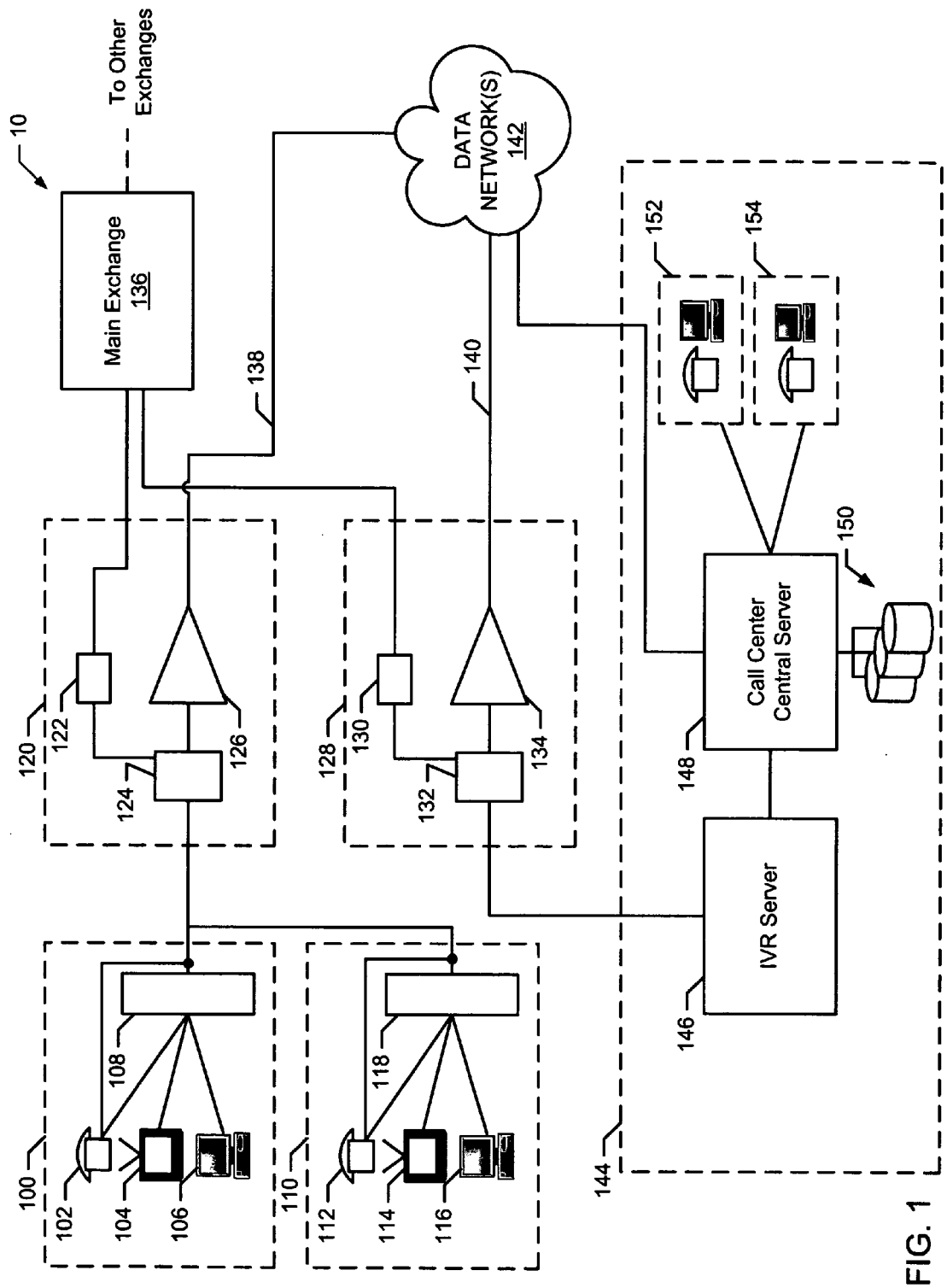
FIG. 1 is a block diagram of an example telecommunications system that may utilize the methods and apparatus for predicting the reason that a person is calling a call center.

FIG. 1 is a block diagram of an example telecommunications system 10 that may handle customer support requests by, for example, predicting the reason that a person is calling a call center. The example telecommunications system 10 includes a first consumer location 100, a second consumer location 110, a first central office 120, a second central office 128, a main exchange 136, a first communication line 138, a second communication line 140, one or more data network(s) 142, and a call center 144.

In general, the call center 144 is a location for handling customer support requests. The call center 144 may be associated with a particular business or may handle customer support requests for a variety of businesses. The customer support requests may relate to products or services purchased from the business or businesses. When customers contact the call center 144 (using voice or data communications) the devices and agents of the call center receive information and requests from the customers and respond to answer the customers' requests. For example, if a business provides DSL Internet service, a customer may call the call center 144 when their DSL Internet service is not working. The devices and agents of the call center 144 will work with the customer to resolve the problems or inform the customer why their Internet connection is not working (e.g., the user did not pay their bill and their service has been disconnected).

The first consumer location 100 and the second consumer location 110 are two examples of the many consumer locations that may exist in a telecommunications system. The first consumer location includes a telephone 102, a television 104, a computer 106, and customer premise equipment (CPE) 108. Likewise, the second consumer location 110 includes a telephone 112, a television 114, and a computer 116.

The telephones 102 and 112 are devices for allowing voice communication between two or more parties. As illustrated, the telephones 102 and 112 may be analog phones communicating over a plain old telephone service (POTS) network (illustrated as the line connecting the telephone to the right side of the CPEs 108 and 118) or may be digital phones communicating over a digital communications network (e.g., Voice Over Internet Protocol (VOIP)) (illustrated as the line connecting the telephone to the left side of the CPEs 108 and 118). The telephones 102 and 112 may be any voice communication device. For example, the telephones 102 and 112 may be wireless telephones, cellular telephones, walkie-talkies, etc.

The televisions 104 and 114 are devices for presenting media content to a consumer at the consumer locations 100 and 110. The televisions 104 and 114 receive media content from the CPEs 108 and 118 and present the media content to the consumer. The television content may be delivered to the first consumer location 100 and the second consumer location 110 via at least one of cable television network, an Internet protocol (IP) television network, a satellite television network, or an over-the-air (OTA) broadcast network. The televisions 104 and 114 may be any device that is capable of presenting media content (e.g., audio, video, and/or data) to consumers. For example, the televisions 104 and 114 may be a radio, a monitor, etc.

The computers 106 and 116 are devices for communicating over an available data network. The computers 106 and 116 are connected to the CPEs 108 and 118, respectively. As explained below, the CPEs 108 and 118 are capable of communicating with an upstream network service provider to allow the computers 106 and 116 to communicate with the available data network. The computers 106 and 116 may be any devices that are capable of handling communication with one or more data networks. For example, the computers 106 and 116 may be desktop computers, laptop computers, handheld computers, cellular telephones having data capabilities, smart appliances that communicate with a data network, etc. In addition, the first consumer location 100 and/or the second consumer location 110 may include one or more hubs, switches, or routers connected to the CPEs 108 and 118 to increase the number of devices that may communicate with the CPEs 108 and 118 and the data networks connected thereto.

The CPEs 108 and 118 are devices for providing communications between the first and second consumer locations 100 and 110 and the central offices 120 and 128, respectively. The CPEs 108 and 118 are capable of communicating with the telephones 102 and 112, the televisions 104 and 114, and the computers 106 and 116. In other words, the CPEs 108 and 118 handle bidirectional communication between the consumer locations 100 and 110 and the central offices 120 and 128. The examples CPEs 108 and 118 include components for handling the communication needs of each of the devices at the consumer locations 100 and 110. For example, the CPEs 108 and 118 may include components for handling VOIP communication, IP television communication, and digital subscriber line (DSL) communication. Of course, the CPEs 108 and 118 may additionally include any other necessary components such as, for example, components for cable Internet, cable television, satellite television, satellite Internet access, OTA television broadcasts, etc. Further, while the CPEs 108 and 118 are illustrated as a single device, persons of ordinary skill in the art will recognize that the functionality of the CPEs 108 and 118 may provided by two or more devices. For example, the CPEs 108 and 118 may be replaced by or may include one or more of a cable Internet modem, an asymmetric digital subscriber line (ADSL) terminal unit—remote (ATU-R, commonly referred to as a DSL modem), a very high bit rate DSL (VDSL) transceiver unit, a synchronous DSL (SDSL) transceiver unit, a high bit rate DSL (HDSL) transceiver unit, a fiber-optic communication transceiver, an integrated services digital network (ISDN) transceiver unit, a multirate symmetric DSL (MDSL) transceiver unit, a rate adaptive DSL (RADSL) transceiver unit, a voice-over DSL (VoDSL) transceiver unit, a satellite data transceiver unit, a POTS modem, a set top box (STB), a residential gateway (RG), a VOIP phone adapter, etc. In addition, the CPEs 108 and 118 may include and/or be coupled with a hub, a switch, and/or a router to allow multiple devices to be connected to the device simultaneously.

The first central office 120 and second central office 128 provide communication between a plurality of consumer locations and service provider networks. For example, the first central office 120 provides communication between the first consumer location 100 and the second consumer location 110 and the main exchange 136 and the one or more data network(s) 142. The first and second central offices 120 and 128 include POTS splitters 124 and 130, POTS switches 124 and 132, and DSL access multiplexers (DSLAM) 126 and 134.

The POTS splitters 122 and 130 separate POTS communications from data communications (e.g., DSL communications). The POTS communications are forwarded to the POTS switches 124 and 132. The data communications are forwarded to the DSLAMs 126 and 134. Persons of ordinary skill in the art will recognize that the POTS splitters 122 and 130 may provide additional or alternative splitting functionality depending on the communication protocols and devices present in the telecommunications system. Further, if a single communications protocol or compatible communications protocols are present, the POTS splitter may not be necessary.

The POTS switches 124 and 132 handle POTS communications from the plurality of consumer locations connected to the central offices 120 and 128. If a call from telephone 102 is received via POTS communications, the POTS switch 124 determines whether the call should be routed to another telephone connected to the first central office 120 or should be routed to a higher level exchange (e.g., main exchange 136) to reach another central office (e.g., second central office 128).

The DSLAMs 126 and 134 are capable of handling data communications between the first and second central offices 120 and 128 and the first and second consumer locations 100 and 110 and the call center 144. The DSLAMs 126 and 134 are capable of handling data communications with multiple CPEs (e.g., CPEs 108 and 118). The DSLAMs 126 and 134 route communications from the first and second consumer locations 100 and 110 to the one or more data network(s) 142 over asynchronous transfer mode (ATM) communication links 138 and 140 or any other communication links. Persons of ordinary skill in the art will recognize that while DSLAMs for communication with CPEs having DSL capabilities are shown, any device that is capable of handling data communications with a consumer location may be used. For example, devices for handling cable communications, fiber optic communications, or dial-up data communications may be used.

The main exchange 136 connects to the first and second central offices 120 and 128 and other national and international exchanges. The main exchange 136 routes calls between the first and second central offices 120 and 128. For example, a call from telephone 102 may be sent using POTS communications from the telephone 102 to the central office 120. The central office 120 then routes the call to the main exchange 136. If the call is directed to the call center 144, the main exchange routes the call to the second central office 128. The second central office 128 routes the call to the call center 144 using the POTS switch 132. Alternatively, if the call was directed to an international location, the main exchange 136 would route the call to an international exchange.

The one or more data network(s) 142 may be data networks associated with a service provider or external to the service provider. For example, the one or more data network(s) 142 may comprise a first network of customers and equipment connected to the service provider and a second network that is external to the service provider (e.g., the Internet). While the one or more data network(s) 142 of FIG. 1 are illustrated as a single unit connected to all data capable devices, persons of ordinary skill in the art will recognize that numerous network topologies may be used. For example, a first network may be connected to a first subset of data capable devices while a second network may be connected to a second, but not mutually exclusive, subset of data capable devices. In addition, separate communication links may be used to connect to a first data network and a second data network. While ATM communication links 138 and 140 are shown connecting the DSLAMs 126 and 134 to the data networks 142, any communication links capable of transmitting data between devices may be used such as, for example, an Ethernet connection with virtual private LAN service (VPLS), a frame-relay connection, any Layer 2 communication protocol, or any other communication protocol.

The call center 144 is a location where one or more call center agents may receive customer calls (e.g., voice communication) or messages (e.g., data communication), both of which are referred to herein as contacts. For example, a call center may handle technical support calls for customers of a telecommunications provider. In another example, the call center may handle calls from customers who purchased a product from the company that is associated with the call center. In another example, the call center may be a general call center that is hired by a company to receive support calls from the company's customers or users. The example call center 144 includes an interactive voice response (IVR) server 146, a call center central server (CCCS) 148, one or more databases 150, first terminal 152, and second terminal 154.

The IVR server 146 receives incoming call center calls from the second central office 128. The IVR server 146 handles initial interaction with the callers. For example, the IVR server 146 may play a pre-recorded message when a call is initially received. The IVR server 146 may then request that the caller provide speak or enter using the telephone keypad an identifier for the caller. For example, the caller may enter an account number, a phone number, or a social security number. The IVR server 146 may additionally route the call to the CCCS 148 or one of the first and second terminals 152 and 154. In addition, the IVR server 146 may interact with the CCCS 148 to further handle the call. For example, the IVR server 146 may pass the identifier received from the caller to the CCCS 148 and await further instructions. In other words, the IVR server 146 provides the functionality of receiving phone calls and interacting with the caller using pre-recorded and computer generated messages. Persons of ordinary skill in the art will recognize that the IVR server 146 may receive calls using POTS communications, VOIP communications, or any other communication method.

The CCCS 148 is capable of receiving data and communications associated with customer contacts and replying to our routing the customer contacts. Data associated with POTS or VOIP communications may be received from the IVR server 146. In addition, VOIP communications, instant message communications, webpage communications, communications from CPEs 108 and 118, and any other type of data-based communication may be received from the one or more data network(s) 142. The CCCS 148 receives identifiers to recognize the customer initiating the contact, requests for support from the customers, and handles interactive communication with the customers. For example, a contact including an identifier and a support question may be received by the CCCS 148. The CCCS 148 using available resources to generate a response to the support question and communicates the response to the customer (possibly using the IVR server 146 in the case of voice communications).

The CCCS 148 is connected to one or more data sources 150. The one or more data sources 150 may be any available data source such as, for example, a database of customer records, a database of equipment inventory, a database of business rules, a database of accounting records, a data source providing information about the status of network equipment, a database containing customer contact historical data, a database containing product purchase history, etc. The CCCS 148 retrieves data from the one or more data sources 150 to handle customer contacts. For example, when an identifier for a customer is received, the CCCS 148 may query one or more of the one or more data sources 150 to obtain information about the customer. In addition, the CCCS 148 may obtain business rules from one or more of the one or more data sources 150. The business rules and the data associated with the customer obtained from the one or more data sources 150 may be used to provide support to the customer. The CCCS 148 is described in further detail in conjunction with FIG. 2.

The first terminal 152 and the second terminal 154 are each comprised of a telephone and a computer at which a call center agent is stationed. When the CCCS 148 determines that a contact requires support from a call center agent, the CCCS 148 routes the call to a terminal (e.g., 152 and/or 154) that is not currently handling a call. For example, the CCCS 148 may receive information from the caller and, in response, present information to the caller to fulfill the reason that the caller is calling. If the CCCS 148 cannot fulfill the reason for the caller's call, the CCCS 148 will route the call to either the first terminal 152 or the second terminal 154 depending on the availability of each. Of course, while two terminals are illustrated in FIG. 1, any number of terminals may be present at a call center. In addition, while the example terminals are illustrated as comprising a telephone and a computer, any desired configuration may be used. For example, each terminal may include an integrated telephone and computer or may not include a telephone if all contacts are to be handled via the computer.

For ease of illustration, FIG. 1 is a simplified version of a telecommunications system. Persons of ordinary skill in the art will recognize that an actual telecommunications system may include other components not illustrated in FIG. 1. In addition, an actual telecommunications system will likely include many more consumer locations, central offices, and exchanges. Further, the connections of equipment illustrated in FIG. 1 are not intended to be exclusive. For example, the first and second terminals 152 and 154 may be connected to the IVR server 146 or may be connected to another server which interposes between the CCCS 148 and the first and second terminals 152 and 154.

Figure 2:
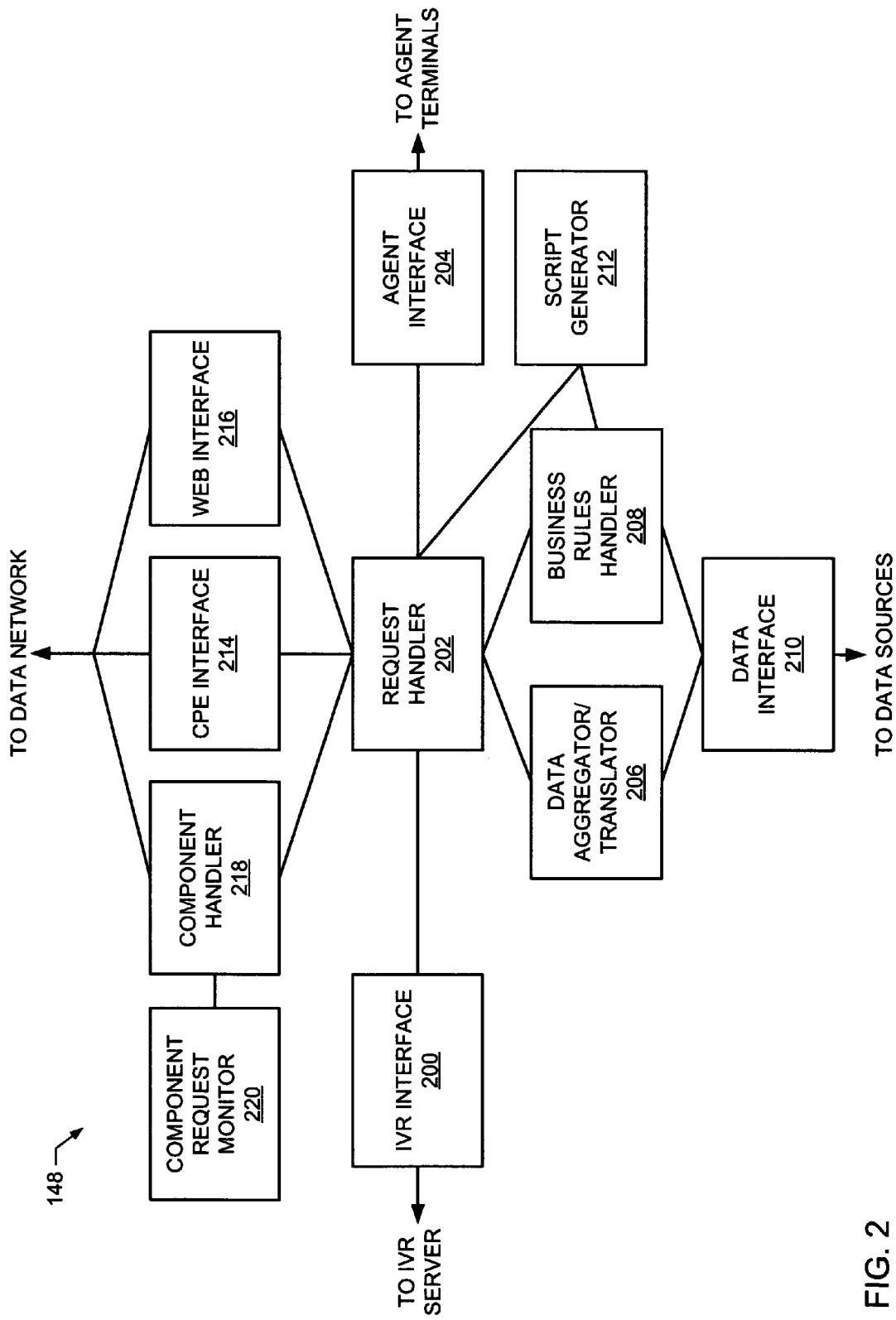
FIG. 2 is a block diagram of an example implementation of the call center central server of FIG. 1.

FIG. 2 is a block diagram illustrative of an example implementation of the CCCS 148 of FIG. 1. The example CCCS 148 includes an IVR interface 200, a request handler 202, an agent interface 204, a data aggregator/translation 206, a business rule handler 208, a data interface 210, a script generator 212, an CPE interface 214, a web interface 216, a component handler 218, and a component request monitor 220.

In general, the CCCS 148 receives contact requests via the IVR interface 200, the CPE interface 214, and the web interface 216. The request handler 202 retrieves data from the available data sources to respond to the request associated with the contact. The CCCS 148 interacts with the contact via the IVR interface 200, the CPE interface 214, and the web interface 216. If the CCCS 148 determines that the contact requires assistance from a call center agent, the CCCS 148 routes the call to an available agent terminal via the agent interface 204. The components of the CCCS 148 will now be described in further detail.

The example IVR interface 200 is interfaces with an IVR server such as, for example, IVR server 146 of FIG. 1. The IVR interface 200 receives information associated with contacts from the IVR server. The IVR interface 200 also transmits information for the contacts to the IVR server. For example, when a customer contacts the call center they may give their account number to the IVR server. The IVR server transmits the account number to the IVR interface 200. The CCCS 148 then generates a response to the customer contact and transmits the response to the IVR interface 200. If the response is in the form of text, the IVR interface 200 converts the text to speech and presents the speech to the user. If the response is in the form of speech, the IVR interface 200 presents the speech to the customer. The IVR interface 200 includes the ability to authenticate with the IVR server 146. In addition, the IVR interface 200 may interface with two or more IVR servers if available.

The request handler 202 receives information associated with a contact from the IVR interface 200, the CPE interface 214, and the web interface 216. In addition, the request handler 202 may receive information associated with the contact from the agent interface 204. The request handler 202 may request further data from the data aggregator/translator 206, the business rules handler 208, and the component handler 218. Using the information associated with the contact and any retrieved data, the request handler 202 generates one or more responses to the contact. The response may be in the form of text or speech messages sent to the IVR interface 200, the CPE interface 214, the web interface 216, and/or the agent interface 204. The response may also be in the form of a script transmitted to the agent interface that an agent can read or write to a contact.

The agent interface 204 communicates with one or more agent terminals such as, for example, first and second agent terminals 152 and 154 of FIG. 1. The agent interface 204 receives information associated with a contact that is entered by an agent at a terminal. The agent interface 204 transmits responses generated by the request handler 202 to the agent terminals.

The data aggregator/translator 206 receives data from the data interface 210, combines the data (e.g., combines data from a first data source and a second data source), and converts it to be useful to the request handler 202. In particular, the data aggregator/translator 206 may receive data that has been retrieved from multiple databases and combine the data into a single data set. For example, the data aggregator/translator 206 may request that the data interface 210 retrieve all data associated with a particular customer account number from an accounting database, an inventory database, and a contact information database. The data aggregator/translator 206 will then combine the data retrieved from each of the databases into a single set of data. Further, if all of the retrieved datasets are not in the same format or the format is not readable by the request handler 202, the data aggregator/translator 206 will convert the datasets to a single-supported format. This translation may include converting to a binary format, a text format, a particular data layout, an ordering of the data retrieved, etc. Persons of ordinary skill in the art will recognize that, if desired, the data aggregator/translator 206 may combine the data to form more than one dataset.

The business rules handler 208 receives business rules from the data interface 210. The business rules are stored in one or more data sources such as, for example, data sources 150 of FIG. 1. The nature of the business rules varies according to the purpose of the call center and the business or businesses that are associated with the call center. In general, the business rules comprise instructions for handling requests for support. For example, a business rule may indicate that if a user cannot hear audio output on their television, the CCCS 148 should instruct them to check whether the television is muted. In addition, business rules may indicate how calls are to be directed within the call center. For example, if a call is received from a business it should be handled by one set of agents and if a call is received from a residential customer it should be handled by a different set of agents. The business rules handler 208 is capable of storing the business rules retrieved from the databases via the data interface 210 and is capable of transmitting the business rules to the request handler 202 and the script generator 212. The business rules handler 208 may include a user interface for creating, deleting, and modifying business rules.

The database interface 210 connects to a plurality of data sources such as, for example, data sources 150 of FIG. 1. The data sources may be any available data source including, but not limited to, a file, a database, a stream of data, a hard drive storage unit, a volatile memory storage unit, or a person at a computer terminal. The data interface 210 includes the functionality to connect to any desired data sources. The data interface 210 transmits data retrieved from the data sources to the data aggregator/translator 206 and transmits business rules to the business rules handler 208. The data interface 210 is also capable of writing data to the data sources if desired.

The script generator 212 uses data received from the request handler 202 and the business rules handler 208 to generate scripts for agents of the call center. The script is a detailed description of how the agent is to handle the contact. For example, a script may instruct an agent to ask a customer a list of questions and enter the responses in the computer terminal, to execute a particular command at the computer terminal, and to read to the user a certain message shown on the computer terminal. The business rules received from the business rules handler 208 may be the basis for generating the script. For example, the script generator or the request handler 202 may communicate some data or information to the business rules handler 208. The business rules handler 208 then retrieves business rules relevant to the received data or information and transmits the business rules to the script generator 212. The script generator 212 then combines the business rules to generate the agent script. The script generator 212 may add questions to the script so that the agent will retrieve further data or information from the customer.

The CPE interface 214 communicates with CPEs over a data network located at consumer locations such as, for example, CPEs 108 and 118 of FIG. 1. The CPE interface 214 receives contacts made through CPEs. For example, a customer may experience difficulty changing channels and may press a button on their remote control to send a request for support to the call center. The request is received by the CPE interface 214. In addition, the customer may enter and/or the CPE may automatically send data associated with the customer and/or the CPE to the CPE interface 214. The CPE interface 214 transmits the request and associated data to the request handler 202. When a response to the request is generated, the response is sent via the CPE interface 214. The CPE interface 214 may comprises an open port, socket, or interface for the request handler 202 or may be a data server capable of transmitting a user interface to CPEs.

The web interface 216 communicates over a data network to allow customers to contact the call center using a web browser. The data network may be a private network or a public network (e.g., the Internet). The web interface 216 may receive data from one or more associated web servers or may be a web server itself. Similar to the CPE interface 214, the web interface 216 passes requests and associated data to the request handler 202 and transmits responses to the one or more associated web servers or to a connected web browser. The web interface 216 may allow for communication as live chat messages, a forum for posting messages, email messages, a static webpage, etc. The web interface 216 allows customers to interact with the CCCS 148 without the need to speak to an agent. However, if the web interface 216 determines that the customer's request interaction with an agent, the web interface 216 can instruct the customer to contact an agent using a telephone or can direct the client to text or voice chat via the data network.

The component handler 218 communicates with network components to determine if any of the components (e.g., DSLAMS, network routers, network switches, servers, optical line terminals, etc.) are experiencing a problem. The component handler 218 may use any available connection to communicate with the network components, including communicate over a public network, a private network, or direct connections to the devices. The component handler 218 may connect using a secure connection such as a virtual private network (VPN) connection. For example, the component handler 218 may establish a VPN connection over a public network to a DSLAM at a central office (e.g., the DSLAM 126 of FIG. 1). The component handler 218 may request the DSLAM to provide information about its current state of operation. Based on the information about the information about the state of operation of the DSLAM, the component handler 218 can determine if the DSLAM is operating properly. If, for example, the DSLAM indicates that it is not accepting external connections from consumer locations, the component handler 218 may determine that the component is not functioning properly. If the component handler 218 determines that a component is not functioning properly, the component handler 218 informs the request handler 202.

The component request monitor 220 assists the component handler 218 in determining whether a component may have a problem. The component request monitor 220 stores information about customer contacts (i.e., service calls made by customers). In particular, the component request monitor 220 identifies the components relating to each customer's contact. Accordingly, the component request monitor 220 can track the number of customer contacts that are associated with each of the components. Based on the number of customer contacts associated with a component, the component request monitor 220 may determine that a component has a problem, or that a component should be verified to determine if it has a problem. For example, if the number of customer contacts associated with a component exceeds a threshold the component request monitor 220 may indicate that the device may have a problem and notify support personnel that they should check the component. The component request monitor 220 may use any available information to determine with which components a particular customer contact is associated. For example, the component request monitor 220 may receive a list of components that are associated with a customer contact from the request handler 202, which has obtained the list from an inventory database via the data aggregator/translator 206 and the data interface 210.

Figure 3:
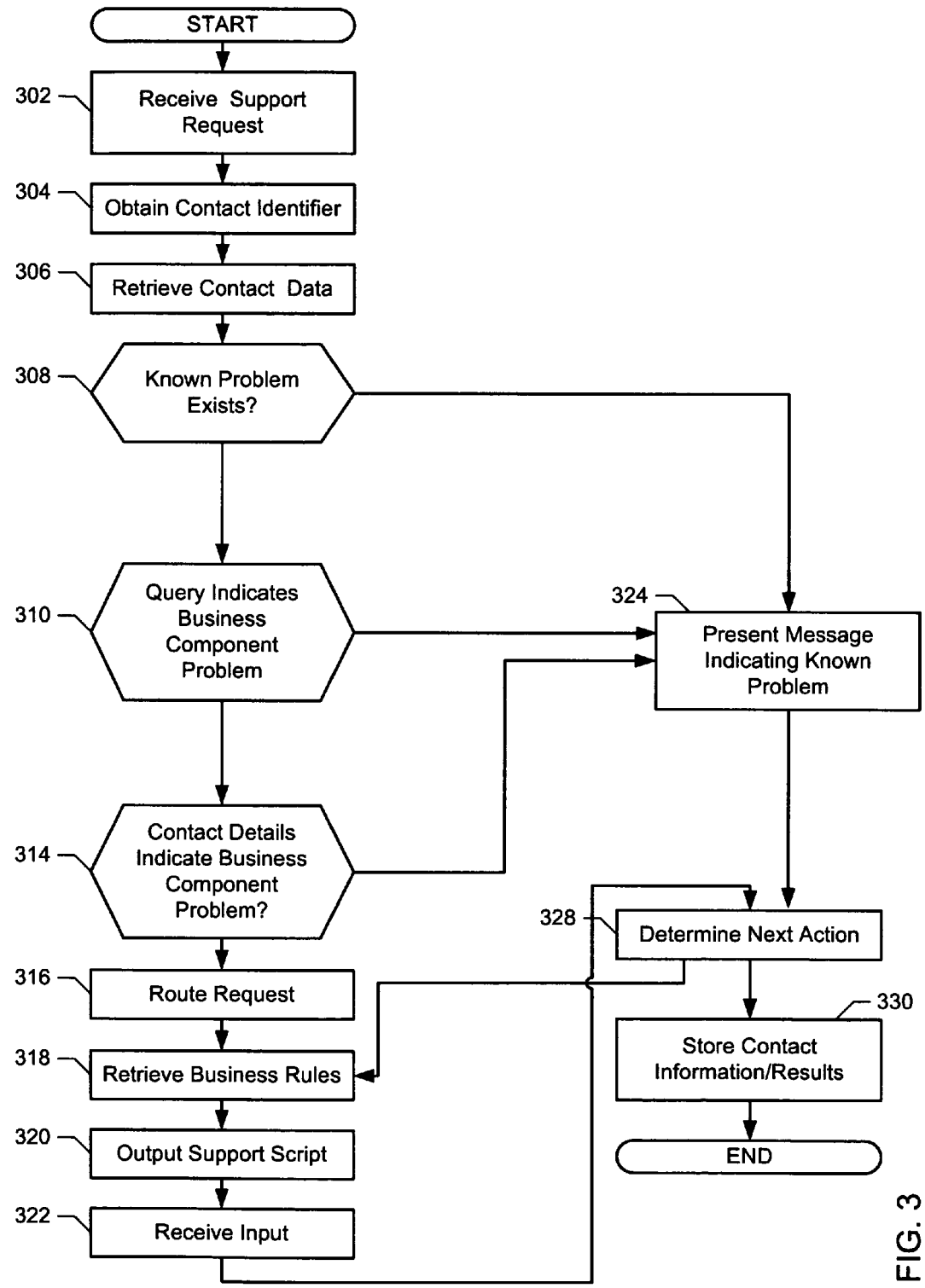
FIG. 3 is a flow diagram of an example process of handling customer support requests.

FIG. 3 is a flow diagram that is representative of an example process 300 that may be executed to carry implement the example CCCS 148 of FIGS. 1 and 2. The process 300 may be implemented by dedicated hardware and/or by hardware (e.g., processors or controllers) executing machine readable instructions written in software or firmware and stored on computer readable media (e.g., memory, hard disk, etc.). Additionally or alternatively, some of the process steps may be carried out manually. As will be readily appreciated by those having ordinary skill in the art, the order in which certain aspects of the process 300 are shown in FIG. 3 is merely one example of the order in which the process 300 may be carried out.

Process 300 execution begins when the example CCCS 148 receives a support request via the IVR interface 200, the CPE interface 214, or the web interface 216 (block 302). Using the IVR interface 200, the CPE interface 214, or the web interface 216 the CCCS 148 obtains an identifier associated with the contact (block 304). The CCCS 148 then uses the data translator/aggregator 206 and the data interface 210 to retrieve data associated with the contact (block 306). The request handler of the CCCS 148 then determines if a problem associated with the contact is known (block 308). For example, the data associated with the contact may indicate that service to the customer was disconnected because the customer has not paid their bill.

If a problem associated with the contact is known, the CCCS 148 uses the IVR interface 200, the CPE interface 214, or the web interface 216 to present a message to the contact describing the problem and/or providing instructions for resolving the problem (block 324). For example, if the known problem is that the customer has not paid their most recent bill, the message may indicate that the customer should contact the billing department or the CCCS 148 may automatically route the call to the billing department. After presenting the message to the customer, control proceeds to block 228 which is described in detail herein.

Returning to block 308, if a problem associated with the contact is not known, the CCCS 148 determines whether a problem with a business component exists (block 310). For example, the CCCS 148 may receive data from the component handler 218 indicating that a DSLAM at a central office is not functioning properly. In another example, the CCCS 148 may receive data from the data aggregator/translator 206 indicating that a service utilized by the customer is undergoing maintenance and is, thus, not available.

If a business component problem is found, the CCCS 148 uses the IVR interface 200, the CPE interface 214, or the web interface 216 to present a message to the contact describing the problem (block 324). For example, if the service utilized by the customer is undergoing maintenance, the message may indicate the expected duration of the maintenance and indicate a method to obtain the service through another system.

Returning to block 310, if a problem with a business component is not found, the request handler 202, the component handler 218, and/or the component request monitor 220 determine whether previous contact details indicate that a problem with a business component exists (block 314). For example, if a large number of contacts indicate that their DSL Internet service is not working and a large number of those contacts connect through the same DSLAM at a central office, it is possible that there is a problem with that DSLAM.

If a problem with a business component is found, the CCCS 148 uses the IVR interface 200, the CPE interface 214, or the web interface 216 to present a message to the contact describing the problem (block 324). For example, if the contact details point to a problem with a DSLAM, the message may indicate that support personnel have been alerted to a problem and/or may allow the customer to be routed to an agent that can provide further details. If the call is routed to an agent, the fact that the contact details point to a problem with a DSLAM may be routed to that agent as well. Additionally or alternatively, the request handler 202 and/or the script generator 212 may automatically generate a script that tells the agent how to describe the problem to the customer.

Returning to block 314, if a problem with a business component is not found, the request handler 202 of the CCCS 148 uses the agent interface 204 to route the call to an agent (block 316). If the user has already indicated a reason for the call, the CCCS 148 can route the call to an agent that is associated with the problem. For example, if the user indicates that they are calling about their television service, the CCCS 148 can route the call to an agent that is trained in handling contacts associated with television service. Additionally or alternatively, the call may be routed based on data associated with the contact obtained from the data sources. For example, if the data associated with the contact indicates a possible reason for the customer's contact, the CCCS 148 can route the call to an agent that is trained to handle that reason. For example, if the data associated with the contact indicates that the customer only subscribes to one of three services offered by the business associated with the call center, the CCCS 148 can route the call to an agent that is trained in handling contacts associated with the one service. Additionally or alternatively, the CCCS 148 may automatically request that a service technician be dispatched to perform repairs at the user's home or to network components.

After the call has been routed to an agent, the request handler 202 and/or the script generator 212 of the CCCS 148 retrieve available business rules from the business rules handler 208 (block 318). The business rules are used to generate and output a script for the agent (block 320). The script may provide suggestions for the agent and/or may provide specific lines that the agent is to read to the customer. In addition, the script may instruct the agent to obtain further information from the customer. The information may be entered in the terminal and sent to the CCCS 148 for processing. For example, an example script is:

AGENT: Hello, thank you for calling <business name>, can you please verify your date of birth for security reasons?
Wait for customer response.
DO: [Ensure date of birth is: <date of birth>.]
AGENT: Thank you. I'm sorry that you are experiencing difficulties with your service. We take pride in providing excellent service, I'll do everything I can to resolve your problems. Can you please read the serial number that is listed on the bottom of your device?
Wait for customer response.
DO: [Enter the serial number here: _____.]

After the agent provides an input that is sent to the CCCS 148, the request handler 202 and/or the script handler 216 receive the input value(s) (block 322). The request handler 202 and/or the script handler 216 use the input value(s) to determine the next action for the agent (block 328). The request handler 202 may pass control to block 318 to continue providing script for the agent to follow or the request handler 202 may pass control to block 330 if the contact is complete. For example, in the case of the forgoing example script, if the serial number entered is for a piece of equipment that is obsolete, the request handler 202 and/or the script handler 216 may modify the script to tell the agent to inform the customer that they must obtain a new piece of equipment. Alternatively, the serial number may indicate the proper set of troubleshooting steps that must be taken if the business supplies several different types of devices.

When the customer contact is complete (e.g., the problem is resolved or no further support can be provided at this time), information about the contact, the actions taken, and the results of the contact are stored in one of the available data sources (block 330). In addition, information about which business components are associated with the customer or the contact may be sent to the component request monitor 220. Of course, persons of ordinary skill in the art will recognize that while the storage of the information is illustrated at the end of the flow diagram of FIG. 3, storage of information may occur throughout the execution of the machine readable instructions illustrated in FIG. 3.

After the contact information has been stored to a data source, the contact is ended. If the contact was a telephone call, the call is disconnected. If the contact was initiated from a CPE, the CPE is returned to the normal operation state (e.g., a main menu or presentation of media content). If the contact was initiated from a web browser, the customer is presented with a screen indicating that the support contact has ended.

Figure 4:
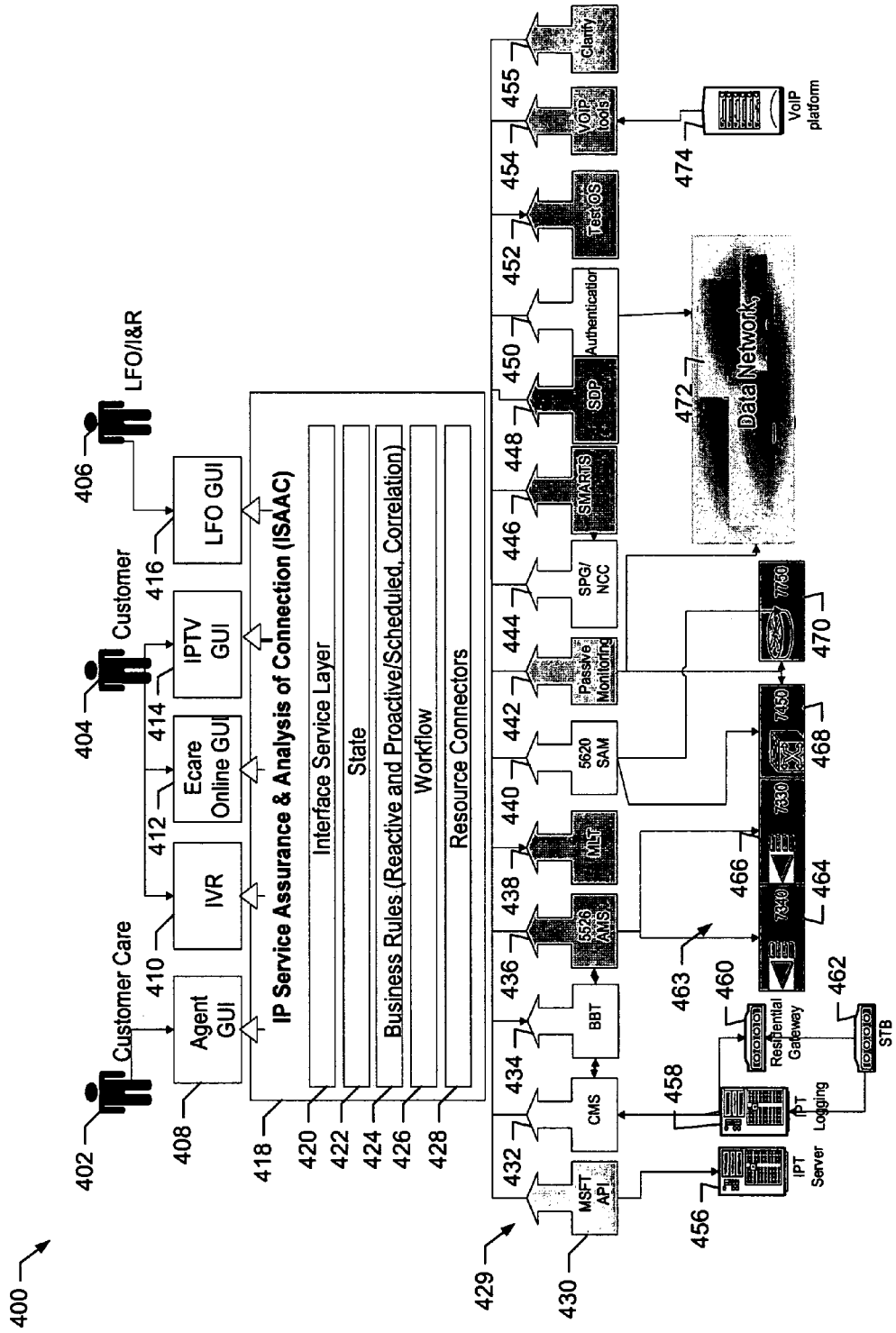
FIG. 4 is a block diagram of one example implementation of the call center of FIG. 1.

FIG. 4 is a block diagram of an example telecommunication system 400 for implementing the call center 144 of FIG. 1 including the CCCS 148 illustrated in FIG. 2. The telecommunication system 400 may be used to handle telephone calls, webpage requests, and CPE requests for support for a business that provides DSL internet service, POTS and/or VoIP telephone service, and IP television (IPTV) service.

FIG. 4 includes a customer care agent 402, a customer 404, a local field office (LFO)/information and repair (I&R) agent 406, an agent interface 408, an IVR interface 410, an eCare online interface 412, an IPTV interface 414, an LFO interface 416, an IP Service Assurance and Analysis of Connection (ISAAC) server 418, a plurality of data interfaces 429, an IPTV server 456, an IPTV logging server 458, a residential gateway 460, an STB 462, a plurality of data sources 463, and a VoIP server 474.

The customer care agent 402, may be any representative of a call center that handles support contacts from customers. The customer care agent 402 may be equipped with a telephone and/or a computer terminal. The computer terminal is capable of displaying information associated with customers and solutions to customer problems. The customer care agent 402 may be any level of support agent including a tier 1 agent, a tier 2 agent, etc.

The customer 404 is representative of any contact to telecommunications system 400. The customer may be a person contacting the telecommunications system 400 for support or may be an automated contact made by some device (e.g., a CPE, an STB, a residential gateway, a cable modem, a computer, etc.). The customer may contact the call center using any available communication system including a telephone, a computer network, a television network, etc.

The LFO/I&R 406 is a technician and support agent from a local field office. For example, the customer care agent 402 may be located at a central call center in a different state than some of customers while several LFO/I&Rs 406 may be located in areas where customers are located. The LFO/I&R 406 may perform functions that the customer care agent 402 is not capable of due to location and other constraints. For example, the LFO/I&R 406 may visit customer homes, make repairs to equipment that provides service to customers, etc.

The IVR server 410 handles incoming telephone contacts by the customer 404. The IVR server 410 may be similar to the IVR server 146 of FIG. 1. As described in conjunction with the IVR server 146, the IVR server 410 uses text-to-speech and recorded messages to interact with customers. The IVR server 410 is capable of transmitting information received from customers to the ISAAC server 418 and is capable of receiving text and/or recorded messages from the ISAAC server 418.

The eCare online interface 412 distributed by Netopia, Inc.© handles incoming contacts made by the customer 404 using a web browser. For example, the customer 404 may point a web browser on their computer to the address of the eCare online interface 412. The eCare online interface 412 serves a webpage to the user that allows the user to interact with the call center. The eCare online interface 412 may be similar to the web interface 216 of FIG. 2. The eCare online interface 412 is capable of transmitting information received from customers to the ISAAC server 418 and is capable of receiving data from the ISAAC server 418.

The IPTV interface 414 handles incoming contacts made by the customer 404 using the customer's television. The IPTV interface 414 may be similar to the CPE interface 214. The IPTV interface 414 allows the customer 404 to interact with the call center via a CPE at the customer's location. The IPTV interface 414 is capable of transmitting information received from customers to the ISAAC server 418 and is capable of receiving data from the ISAAC server 418.

The agent interface 408 handles interaction between the customer care agent 402 and the ISAAC server 418. The agent interface 408 may be similar to the agent interface 204 of FIG.

2. The agent interface 408 may employ graphical user interface, a text interface, a voice interface, and/or any other method of communication. The agent interface 408 is capable of transferring data associated with the customer 404 to the customer care agent 402. In addition, the agent interface 408 is capable of transmitting data input by the customer care agent 402 to the ISAAC server 418. The customer care agent 402 may interact with the agent interface 408 using a telephone, a computer, and/or any other device.

The LFO interface 416 handles interaction between the LFO/I&R 406 and the ISAAC server 418. The LFO interface 416 may be similar to the agent interface 204 of FIG. 2. The LFO interface 416 may employ graphical user interface, a text interface, a voice interface, and/or any other method of communication. The LFO interface 416 is capable of transferring data associated with the customer 404 to the LFO/I&R 406. In addition, the LFO interface 416 is capable of transmitting data input by the LFO/I&R 406 to the ISAAC server 418. The LFO/I&R 406 may interact with the LFO interface 416 using a telephone, a computer, a beeper, and/or any other device.

The ISAAC server 418 is a central server for handling communication between the customer 404 and the customer care agent 402 and the LFO/I&R 406. In addition, the ISAAC server 418 is capable of communicating with a plurality of data interfaces 429 to receive external data. The ISAAC server 418 may be similar to the CCCS 148 of FIGS. 1 and 2. The ISAAC server 418 comprises an interface service layer 420, a state layer 422, a business rules layer 424, a workflow layer 426, and a resource connectors layer 428.

The interface layer 420 provides communication between the ISAAC 418 and the agent interface 408, the IVR interface 410, the eCare online interface 412, the IPTV interface 414, and the LFO interface 416. The interface layer 420 may be similar to the data aggregator/translator 206 of FIG. 2.

The state layer 422 stores the state of a customer's support request. For example, when a customer contacts the call center and performs several self-help steps, it may be desirable to remember the steps performed so that the customer is not asked to repeat the same steps later. The state layer 422 handles storage of the steps performed and the results of those steps. The state layer 422 allows a customer to end a first session of a contact and resume a second session of the contact at a later time without the ISAAC server 418 losing the information about the steps performed during the first session. In addition, the state layer 422 allows a customer to conduct a first session of a contact utilizing the eCare online interface 412 and a second session of the contact using the IVR interface 410. Information provided during the first session is available to the ISAAC server 418 or the customer care agent 402 during the second session. Further, the state layer 422 is capable of passing the steps performed and the results to the customer care agent 402 if the call is transferred. In addition, the state layer 422 is capable of monitoring customer contacts and the results of the contacts to look for patterns in problems reported. For example, the state layer 422 may track the number of support contacts associated with a particular service and may indicate that the service is likely experiencing a problem if the number of contacts exceeds a threshold. The state layer 422 may be similar to the component request monitor 220 and the request handler 202 of FIG. 2.

The business rules layer 424 retrieves business rules stored at the ISAAC 418 or stored in external data sources. The business rules layer 424 uses the business rules to generate responses to customer contacts and to route customer contacts to the proper location. In addition, the business rules layer 424 enables agents to schedule support tests to be performed and analyzed. The business rules layer 424 may similar to the business rules handler 208 of FIG. 2.

The workflow layer 426 organizes the business rules from the business rules layer 424 to handle support contacts and to generate agent scripts. The workflow layer 426 analyzes multiple business rules and integrates the rules. The workflow layer 426 may be similar to the script generator 212 and/or the request handler 202 of FIG. 2.

The resource connector layer 428 provides communication between the ISAAC 418 and the plurality of interfaces 429. The resource connector layer 428 may be similar to the data aggregator/translator 206 of FIG. 2.

The example plurality of data interfaces comprises a Microsoft© IPTV server application program interface (API) 430, a component management system (CMS) 432, a broadband tools (BTT) interface 434, an Alcatel© 5526 AMS element manager interface 436, an metallic line testing (MLT) interface 438, an Alcatel© 5620 service aware manager (SAM) interface 440, a passive monitoring interface 442, an single pane of glass (SPG)/network command center (NCC) interface 444, an EMC© Smarts interface 446, a service delivery platform (SDP) interface 448, an authentication interface 450, a test operating system (OS) database 452, a VoIP tools interface 454, a Clarify interface 455.

The Microsoft IPTV server API 430 enables communication between the ISAAC 418 and the IPTV server 456. The Microsoft IPTV server API 430 may be similar to the data interface 210 of FIG. 2. The Microsoft IPTV server 456 distributes media content to consumer locations that receive IPTV service.

The CMS interface 432 enables communication between the ISAAC 418 and the IPTV logging server 458, the residential gateway 460, the STB 462, a CPE, and any other network components. The CMS interface 432 may be similar to the data interface 210 and/or the component handler 218 of FIG. 2. The CMS interface 432 allows the ISAAC 418 to determine the status of network components and to analyze network components to locate problems.

The IPTV logging server 458 handles logging for communication from the IPTV server 456. The IPTV logging server 458 may log errors, communication statistics, requests for programs, etc. The data available to the ISAAC 418 from the IPTV logging server 458 may be similar to the data sources 150 of FIG. 1.

The residential gateway 460 handles data communication between a central office and the consumer location. The residential gateway 460 may be similar to the CPE 108 or 118 of FIG. 1. The residential gateway allows one or more devices at the consumer location to connect to the data network provided by the server provider. The data available to the ISAAC 418 from the residential gateway 460 may be similar to the data sources 150 of FIG. 1.

The STB 462 handles video data communication between the central office and the consumer location. The STB 462 may be similar to the CPE 108 or 118. The data available to the ISAAC 418 from the STB 462 may be similar to the data sources 150 of FIG. 1.

The BBT interface 434 enables communication between the ISAAC 418 and any available tools for monitoring broadband data communications. For example, a BBT may check for data loss between two points in a broadband communication network. The BBT interface 434 enables the ISAAC 418 to receive the results of the check for data loss.

The plurality of data sources 163 comprise a Alcatel 7340 optical line terminal 464, an Alcatel 7330 optical line terminal 466, an Alcatel 7450 Ethernet switch 468, and an Alcatel 7750 service router 470. The plurality of data sources may be similar to the data sources 150 of FIG. 1. The Alcatel 5526 AMS interface 436 and the Alcatel 5620 SAM 440 enable communication with the plurality of data sources 463. The Alcatel 5526 AMS interface 436 and the Alcatel 5620 SAM 440 may be similar to the data interface 210 of FIG. 2. These devices are well known to persons of ordinary skill in the art and are, thus, not described in further detail herein.

The MLT interface 438 enables the results of an MLT to be communicated to the ISAAC 418. MLT is well known to persons of ordinary skill in the art and is, thus, not described in further detail herein. The MLT interface 438 may be similar to the data interface 210.

The passive monitoring interface 438 enables further communication between the ISAAC 418 and the Alcatel 7450 Ethernet switch 468 and the Alcatel service router 470. The passive monitoring interface 438 can sniff packets on the data networks connected to the Alcatel 7450 Ethernet switch 468 and the Alcatel service router 470 to determine the origin, destination, and contents of packets transmitted by customers. The passive monitoring interface 438 can also obtain statistical information about the volume of data transmitted, the protocols used for transmitting data, and popular origins and destination for data.

The SPG/NCC interface 444 enables communication with tools for managing trouble tickets and network outages. The SPG/NCC interface 444 enables the ISAAC 418 to receive information about known network outages and repairs that are scheduled. The SPG/NCC interface 444 enables the ISAAC 418 to determine the type of outage and the type of customers that are impacted by the outage. The SPG/NCC interface 444 may be similar to the data interface 210.

The EMC Smarts interface 446 enables communication with the EMC Smarts network management tool that enables monitoring of data networks, including data network 472. The EMC Smarts interface 446 may be similar to data interface 210. The EMC Smarts network management tool is well known to those of ordinary skill in the art and is, thus, not described in further detail herein.

The SDP interface 448 enables communication with a service delivery platform (SDP) service provisioning tool. The SDP service provisioning tool stores information about channel maps for IPTV and stores information about which channels authorized for distribution to consumer locations. The SDP interface 448 may be similar to the data interface 210 of FIG. 2.

The authentication interface 450 enables communication with one or more authentication servers and/or data sources. The authentication servers may include Remote Authentication Dial In User Service (RADIUS), Lightweight Directory Access Protocol (LDAP) server, etc. The authentication interface 450 enables the ISAAC 418 to determine if clients are authenticated, to receive errors regarding customer authentication, and other data associated with customer and device authentication. The authentication interface may be similar to the data interface 210 of FIG. 2.

The test OS interface 452 enables communication with tools for monitoring data networks. The test OS interface 452 enables the ISAAC 418 to receive data from tools that can monitor network components for a high speed internet service. The test OS interface 452 may be similar to the data interface 210 of FIG. 2.

The VoIP tools interface 454 enables communication with the VoIP tools 474 for monitoring VoIP data networks. The VoIP tools interface 454 enables the ISAAC 418 to receive data from VoIP tools 474 that can monitor network components used in a VoIP data network. The VoIP tools interface 454 may be similar to the data interface 210 of FIG. 2.

The Clarify interface 455 enables communication with data sources that store customer records and trouble history. For example, the Clarify interface enables communication with the IBM© Clarify Customer Relationship Management tool, the Telecordia© Granite inventory management and service resource management tool, etc. The Clarify interface 455 allows the ISAAC 418 to obtain detailed information about customers, network equipment, equipment installed at customer locations, etc. The Clarify interface 455 may be similar to the data interface 210 of FIG. 2.

The data network 472 is illustrative of any type of data network associated with the call center. The data network 472 may include a local area network for the call center, a wide area network connecting multiple call centers, a public network (e.g., the internet), a private network connecting all network devices associated with the service provider, etc.

FIGS. 5-32 are flow diagrams of example processes for handling customer contacts in a telecommunications system, such as the telecommunication system 400 of FIG. 4. In one example, the methods are adapted for a business providing DSL Internet service, IP television service, and/or telephone service (VOIP and/or POTS). As described above in conjunction with FIG. 3, the example processes of FIGS. 5-32 may be implemented using dedicated hardware and/or hardware (e.g., processors or controllers) executing machine readable instructions written in software and/or firmware stored on computer readable media. Further, some aspects of the processes may be carried out by hand. Additionally, while the example processes are shown in a particular order, those having ordinary skill in the art will readily recognize that the orders of the processes may be changed.

Figure 5:
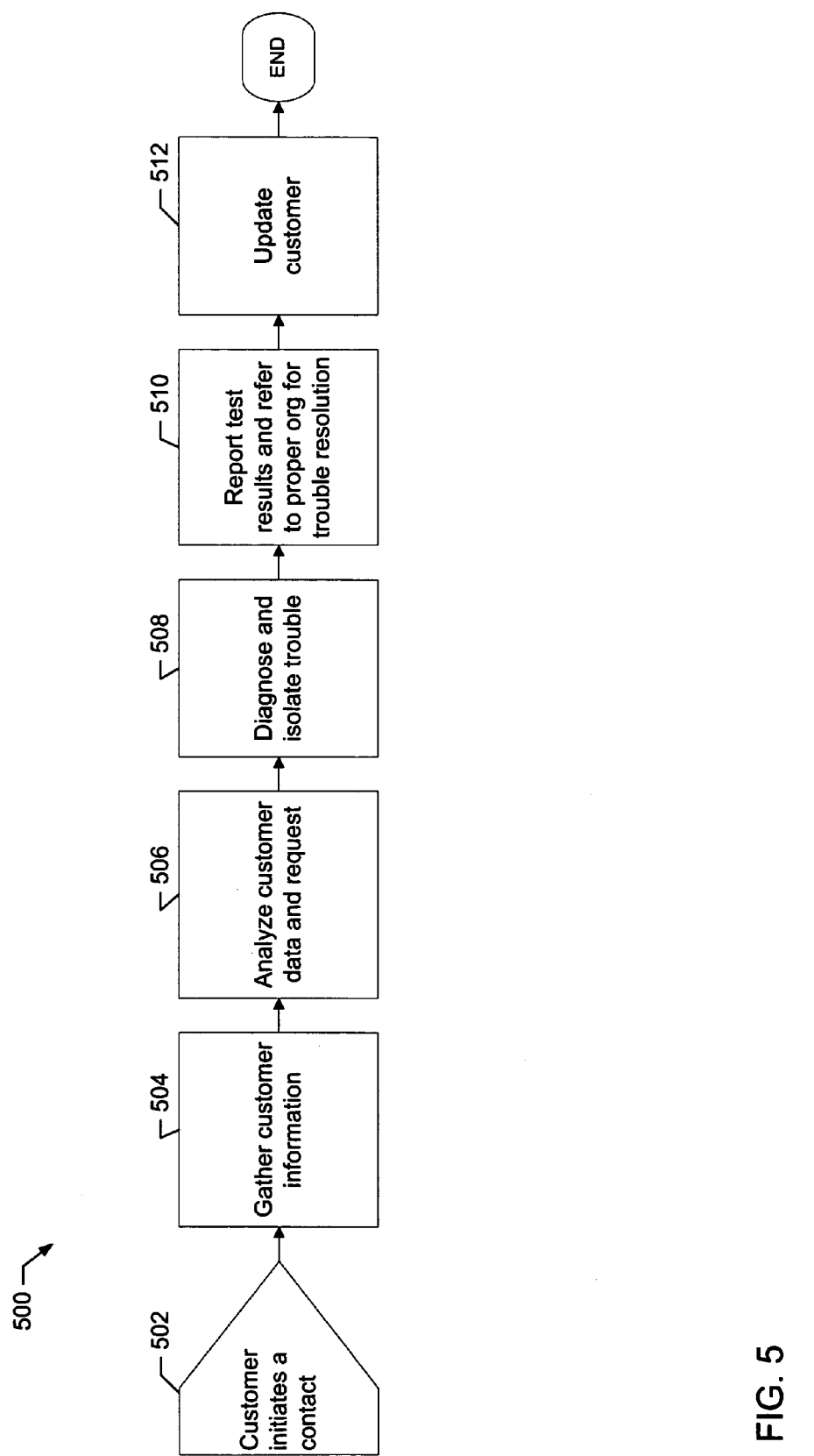
FIGS. 5 to 32 are flow diagrams of example processes that may be carried out by the example call center of FIG. 4.

FIG. 5 is a high level flow diagram of an example process 500 for handling customer contacts. The example process of FIG. 5 begins when a customer initiates a contact to a call center such as, for example, call center 144 of FIG. 1 or telecommunication system 400 of FIG. 4 (block 502). In the example process, the contact may be handled by the IVR interface 200 or the IVR interface 410, the CPE interface 214 or the IPTV interface 414, or the web interface 216 or the eCare online interface 412 of the CCCS 148 of FIG. 1 and the telecommunication system 400 of FIG. 4, respectively. The CCCS 148 or the ISAAC server 418 gathers information associated with the customer and/or the contact from the contact via the IVR interface 200 or the IVR interface 410, the CPE interface 214 or the IPTV interface 414, or the web interface 216 or the eCare online interface 412 and available data sources via the data aggregator/translator 206 or the resource connectors layer 428 (block 504). Then, the CCCS 148 or the ISAAC server 418 analyzes the customer data and the customer's request to determine if the problem can be determined without further interaction (block 506). The CCCS 148 or the ISAAC server 418 then tests network components and analyzes the results of those tests to determine if any of the network components are experiencing problems (block 508). For example, the component handler 218 may query a DSLAM to which a customer is connected to determine if the DSLAM is functioning properly. Then, if necessary, the CCCS 148 routes the call to an agent for the appropriate organization (e.g., DSL Internet service provider, IP television service provider, or telephone service provider) (block 510). Finally, the resolution for the customer is confirmed by the call agent or through the IVR interface 200, the CPE interface 214, or the web interface 216 (block 512).

The following sections provide a detailed description of blocks 504 to 512 in the example process 500 of FIG. 5.

Section I—Gather Customer Information (Block 504)

Figure 6:
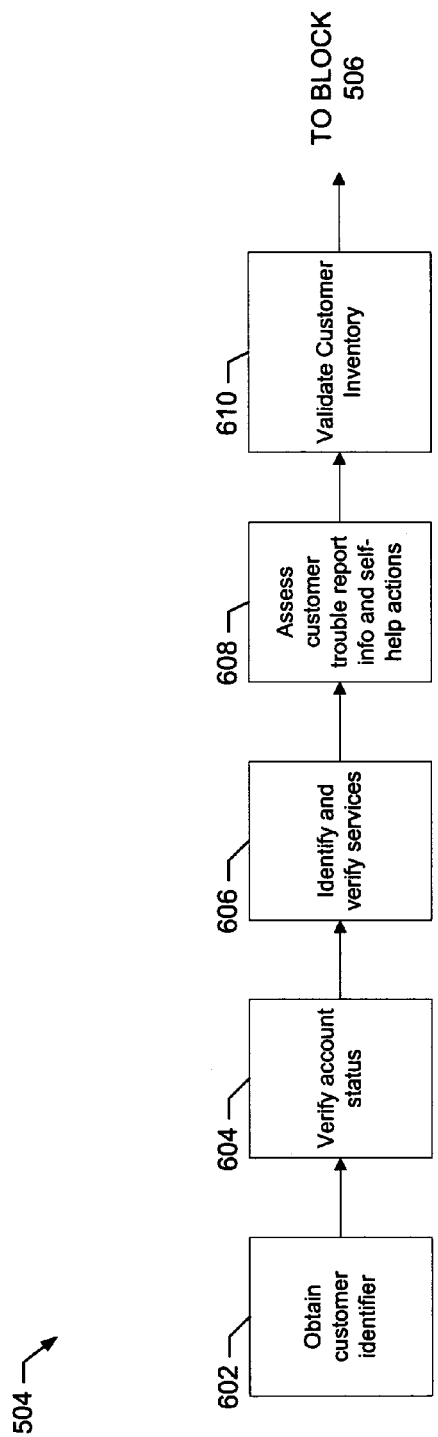

FIGS. 6-16 are flow diagrams of example processes for gathering information about customers that contact a call center. FIG. 6 is a high level flow diagram of an example process for gathering customer information 504. The blocks of FIG. 6 are described below in further detail in conjunction with FIGS. 7-16.

As shown in FIG. 6, the example process for gathering customer information 504 begins when a customer contacts a call center such as, for example, the call center of the telecommunication system 400 of FIG. 4, which includes ISAAC server. Using the IVR interface, the IPTV interface, or the eCare online interface, the ISAAC server obtains a customer identifier (e.g., account number, social security number, name, address, telephone number, equipment serial number, etc.) (block 602). The ISAAC server then uses the available data sources to verify the account status for the customer (block 604). For example, the ISAAC server may verify that the account is still active. The ISAAC server then uses the IVR interface, the IPTV interface, or the eCare online interface to query the user as to which service they are contacting the call center about and the ISAAC server determines whether there is a current network outage affecting that service (block 606). The ISAAC server may record information about the services associated with the customer for later access by a call center agent. The ISAAC server then provides self-help support via the IVR interface, the IPTV interface (block 608). Then the ISAAC server determines if the stored information about network equipment associated with the customer matches the actual network equipment (block 610).

Figure 7:
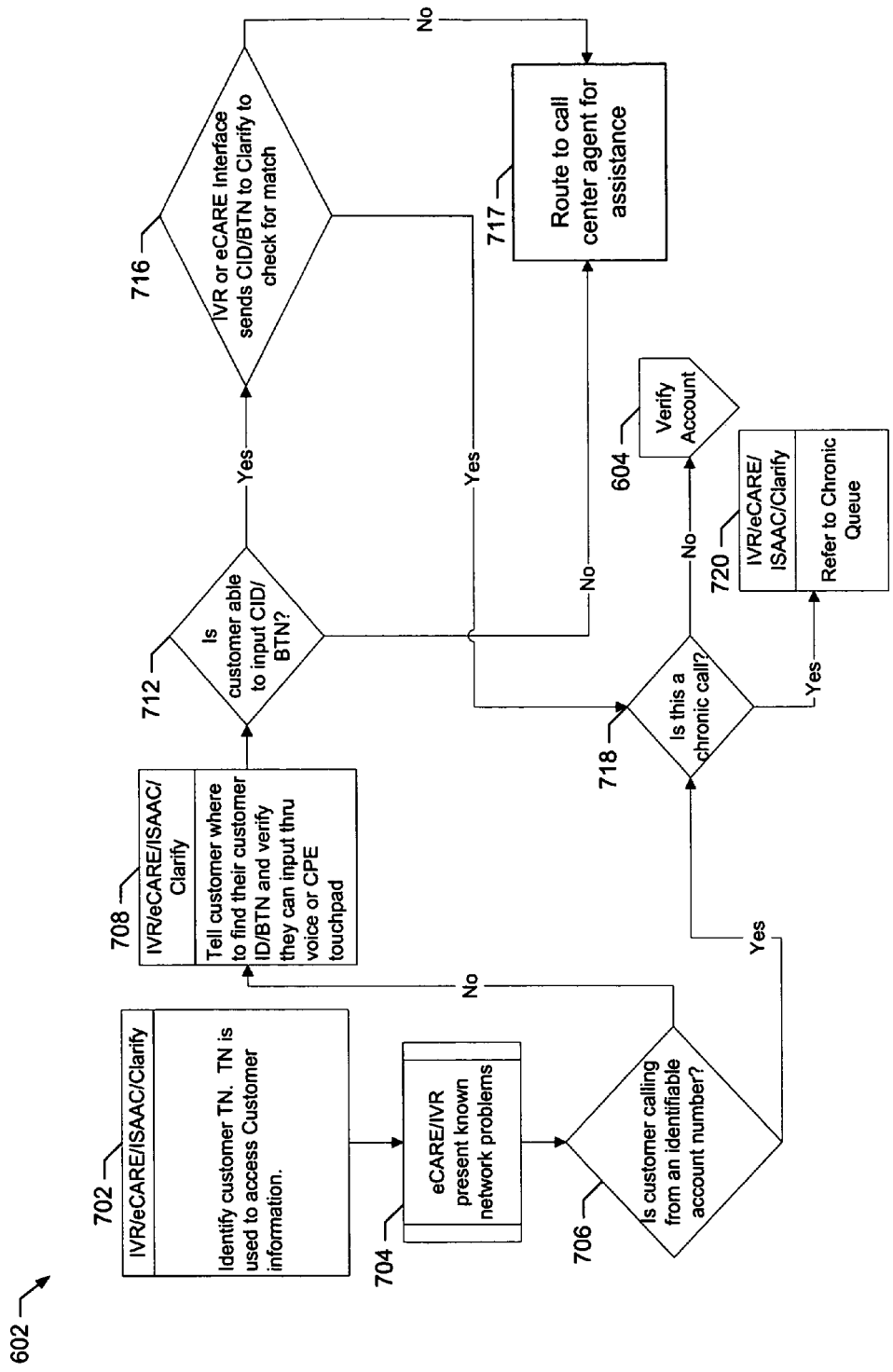

FIG. 7 is a detailed flow diagram of block 602 of FIG. 6, which illustrates an example process for identifying the customer that is contacting the call center. The process 602 of FIG. 7 begins by identifying the telephone number of the customer (block 702). The identification may be performed by the IVR interface 410, the eCare server, directly by an ISAAC server, which is an implementation of the ISAAC server, or a Clarify server. The telephone number is used to access data associated with the customer that is located in available data sources. For example, data associated with known network issues affecting the customer may be retrieved from the data sources.

Then, the eCare server or the IVR interface 410 present known network problems to customer (block 704). For example, the ISAAC server may pass a message to the IVR interface 410 for presentation to the customer that indicates that the network is currently experiencing technical problems. The customer may choose to end the contact at this point or to continue holding to speak to an agent regarding the problem.

The ISAAC 418 then determines if the customer is calling from a telephone number that is properly associated with an account number (block 706). If the customer is calling from an identifiable account number, control proceeds to block 718, which is described in further detail below. If the customer is not calling from an identifiable account number or a telephone number cannot be determined for the customer, the IVR interface 410, eCare server, ISAAC server, or the Clarify server provides instructions to the customer for obtaining their customer identification number (CID) or billing telephone number (BTN) (block 708). Then, the customer enters their CID or BTN (block 708). The customer may enter their number by speaking the number into the telephone, by entering the number using the telephone keypad, by entering the number on their CPE, or by entering the number on a webpage. Block 708 is described in further detail in conjunction with the description of FIG. 8.

The request handler 202 then determines if the customer was able to enter their CID or BTN (block 712). If the customer is not able to enter their CID or BTN, the customer is directed to a call center agent for assistance (block 717). If the customer is able to enter their CID or BTN, the IVR interface 410, the eCare server, or the ISAAC server sends the CID or BTN to the Clarify server to determine if the CID or the BTN matches a valid account number (block 716). If the CID or BTN does not match a valid account number, the contact is routed to a call center agent for assistance (block 717). If the CID or the BTN matches a valid account number, the call is routed to block 718.

After determining a valid account number for the contact (e.g., after block 706 or 716), the ISAAC server determines if the customer associated with the account number has called multiple times and, thus, has been labeled a chronic caller (block 718). If the customer has been labeled a chronic caller, the call is forwarded to an agent that is trained in handling chronic callers (block 720). If the customer is not a chronic caller, the method proceeds to block 604 of FIG. 6 to verify the account status. Block 604 is described in further detail in conjunction with the description of FIG. 9.

Figure 8:
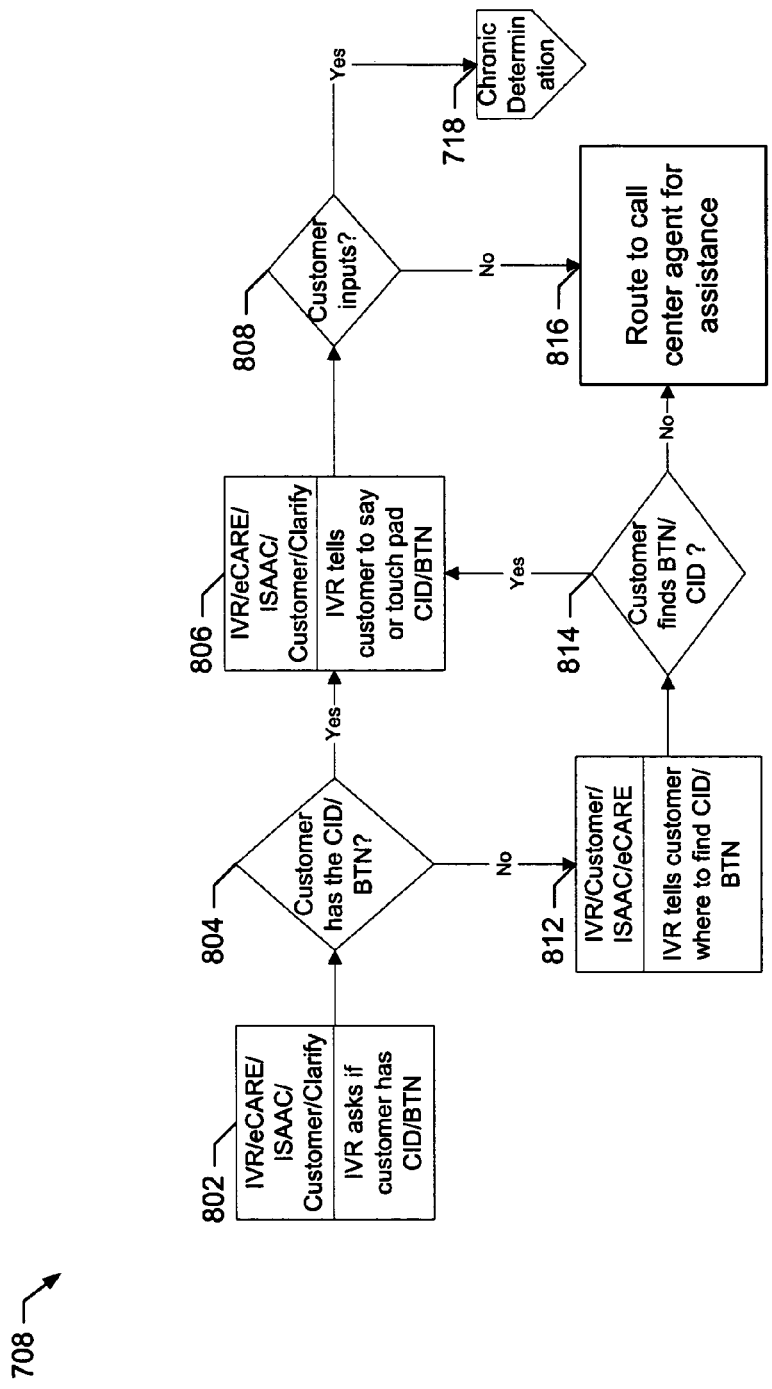

FIG. 8 is a block diagram illustrating a more detailed description of block 708 of FIG. 7, which provides instructions to the customer for obtaining their CID or BTN and providing the number to the CCCS 148. The IVR server 146, the eCare server, the ISAAC server, or the Clarify server first asks the customer whether they have their CID or BTN (block 802). If the customer has their CID or BTN, the IVR server 146, the eCare server, the ISAAC server, or the Clarify server tells the customer to enter the CID or BTN (block 806). If the customer inputs their CID or BTN, control proceeds to block 718 of FIG. 7 to determine if the customer is a chronic caller. If the customer does not input their CID or BTN, control proceeds to block 816, which is described below.

If the customer does not have their CID or BTN, the IVR server 146, the eCare server, the ISAAC server, or the Clarify server tells the customer where to find their CID or BTN (block 812). For example, the IVR server 146, the eCare server, the ISAAC server, or the Clarify server may tell the customer to locate their most recent bill and to locate the number printed on the bill. If the customer is able to locate their CID or BTN, control proceeds to block 806, which has been previously described. If the customer is still unable to locate their CID or BTN, control proceeds to block 816.

If the customer is unable to enter and/or locate their CID or BTN (e.g., after blocks 808 and/or 814), the contact is routed to a call center agent to assistant the customer (block 816). The agent may request further information from the customer and may work with the customer on an individual basis to determine the identity of the customer.

Figure 9:
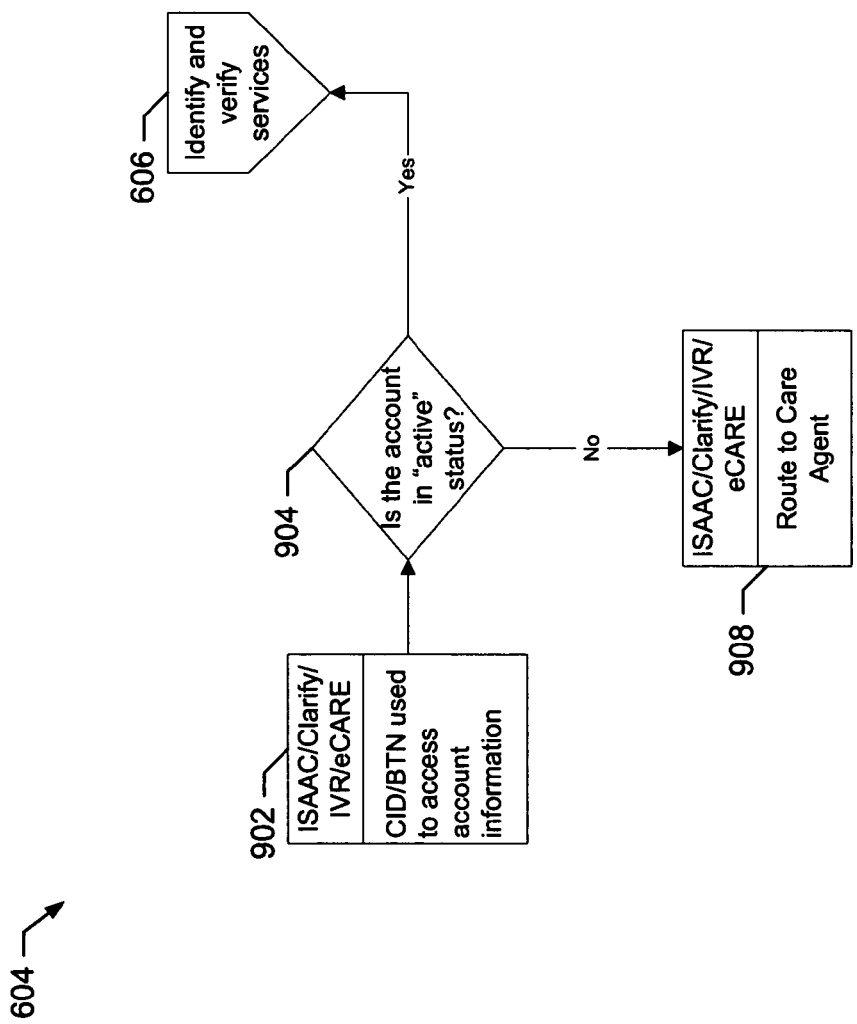

FIG. 9 is a block diagram illustrating a more detailed method for implementing block 604 of FIG. 6, which verifies the status of the account associated with the customer contacting the call center after the customer's identity has been determined. The IVR server 146, the eCare server, the ISAAC server, or the Clarify server accesses account data associated with the customer in available data sources (block 902). For example, the request handler 202 of the CCCS 148 may access an accounting database via the data aggregator/translator 206 and the data interface 210. The IVR server 146, the eCare server, the ISAAC server, or the Clarify server then uses the retrieved data to determine if the account associated with the customer is active (block 904). If the account associated with the customer is active, control proceeds to block 606 of FIG. 6, which has been previously described. If the account associated with the customer is not active, the contact is routed to a call center agent to discuss the account with the customer (block 908). For example, if the customer has previously cancelled their account, the contact may be directed to an agent that is capable of registering the customer with service.

Figure 10:
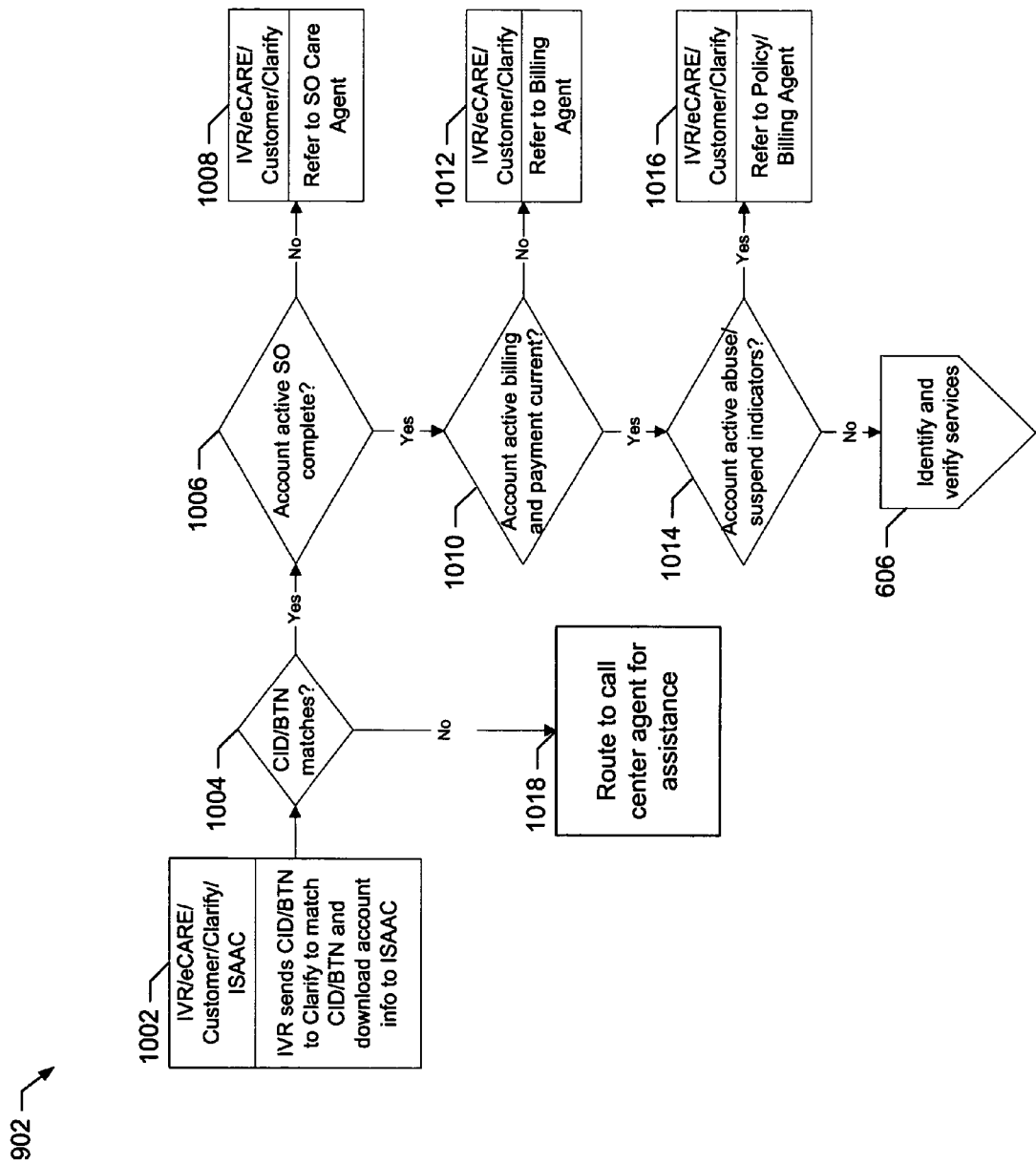

FIG. 10 is a block diagram illustrating a more detailed method for implementing block 902 of FIG. 9, which is a method for retrieving data associated with the customer by using the CID or BTN and verifying whether the customer's account is active. The IVR server 146, the eCare server, or the ISAAC server sends the CID or the BTN to the Clarify server, which retrieves the account number/identifier for the customer and returns the number to the ISAAC server (block 1002). For example, the IVR server 146 sends the CID or BTN to the CCCS 148 via the IVR interface 200. The request handler 202 retrieves the account information via the data aggregator/translator 206 and the data interface 210.

The request handler 202 of the CCCS 148 determines if the CID or BTN matched an account number/identifier (block 1004). If the CID or BTN does not match an account number/identifier, the call is routed to an agent that can provide assistance to the customer (block 1018). If the CID or BTN matches an account number/identifier, the request handler 202 then determines if the SO for the account has been completed (block 1006). If the SO has not been completed, the contact is routed to a call center agent that is capable of handling SO contacts (block 1008). If the SO has been completed, the request handler 202 determines if the account is currently being billed and whether the customer's payments are current (block 1010). If the customer's payments are not current, the contact is routed to a call center agent that can handle billing problems (block 1012). If the customer's payments are current, the request handler 202 determines if the account has been flagged for abuse or has been suspended (block 1014). If the account is flagged for abuse or has been suspended, the contact is routed to a call center agent that is capable of handling problems associated with the acceptable use policy and/or billing problems (block 1016). If the account is not flagged for abuse and has not been suspended, control is passed to block 606 of FIG. 6 to determine which services the customer is contacting the call center about and to determine if there is a network outage associated with those services.

Figure 11:
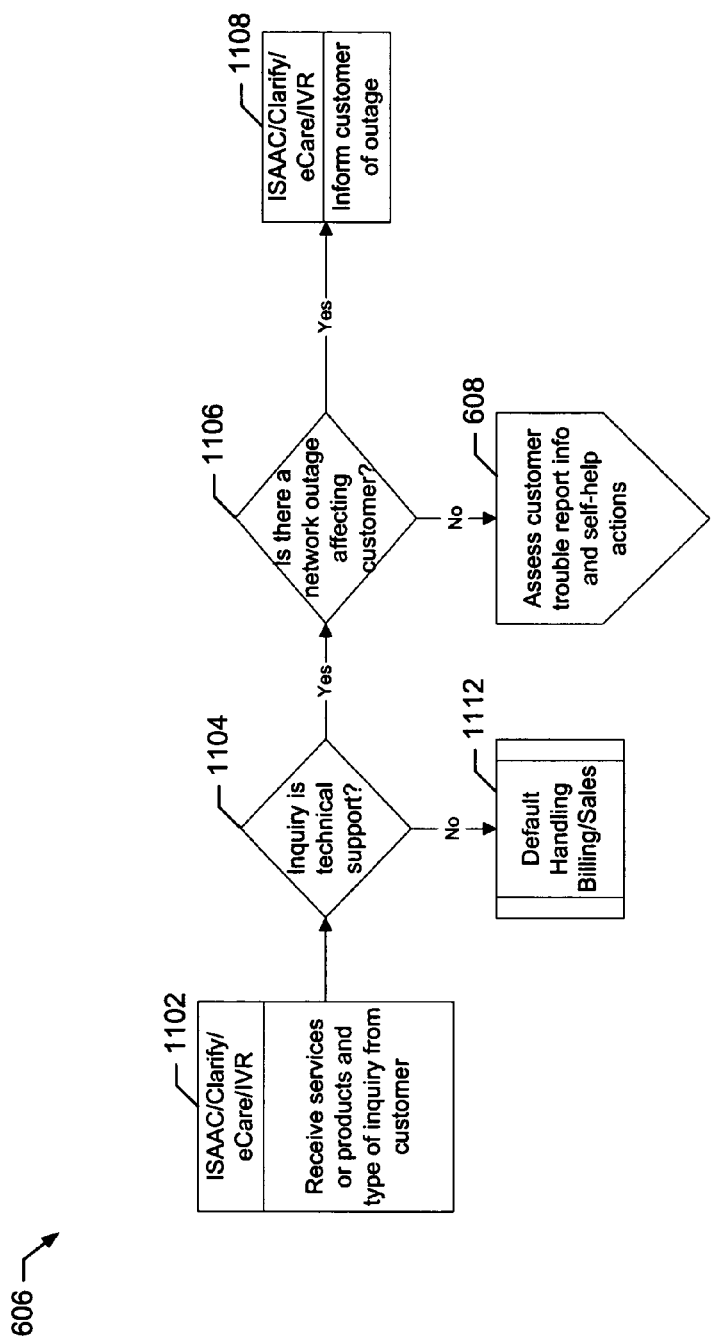

FIG. 11 is a flow diagram illustrating a more detailed method for implementing block 606 of FIG. 6 that determines which services the customer is contacting the call center about and determines if there is a network outage associated with those services. The IVR server 146, the eCare server, the ISAAC server, or the Clarify server receives the identity of the products or services that the customer is contacting the call center regarding (block 1102). In addition, the IVR server 146, the eCare server, the ISAAC server, or the Clarify server receives information about the type of inquiry that the customer is contacting the call center about (block 1102). For example, the IVR server 146 may provide the customer with a list of services offered by the business associated with the call center and allow the customer to select a service from the list. The IVR server 146 may then provide a list of common inquiry categories and allow the customer to select one.

The request handler 202 of the CCCS 148 then determines if the inquiry is related to technical support (block 1104). If the inquiry is not a technical support inquiry, the contact is routed to an agent that can handle billing questions and questions that are not related to technical support (block 1112). If the contact is a technical support contact, the request handler 202 then uses the component handler 218 to determine if there is a network outage that may affect the customer (block 1106). If there is a network outage that may affect the customer, the IVR server 146, the eCare server, the ISAAC server, or the Clarify server notifies the customer of the network outage (block 1108). If there is not a known network outage that would affect the customer, control proceeds to block 608, to assess the customer's trouble report and provide the customer with self-help actions.

Figure 12:
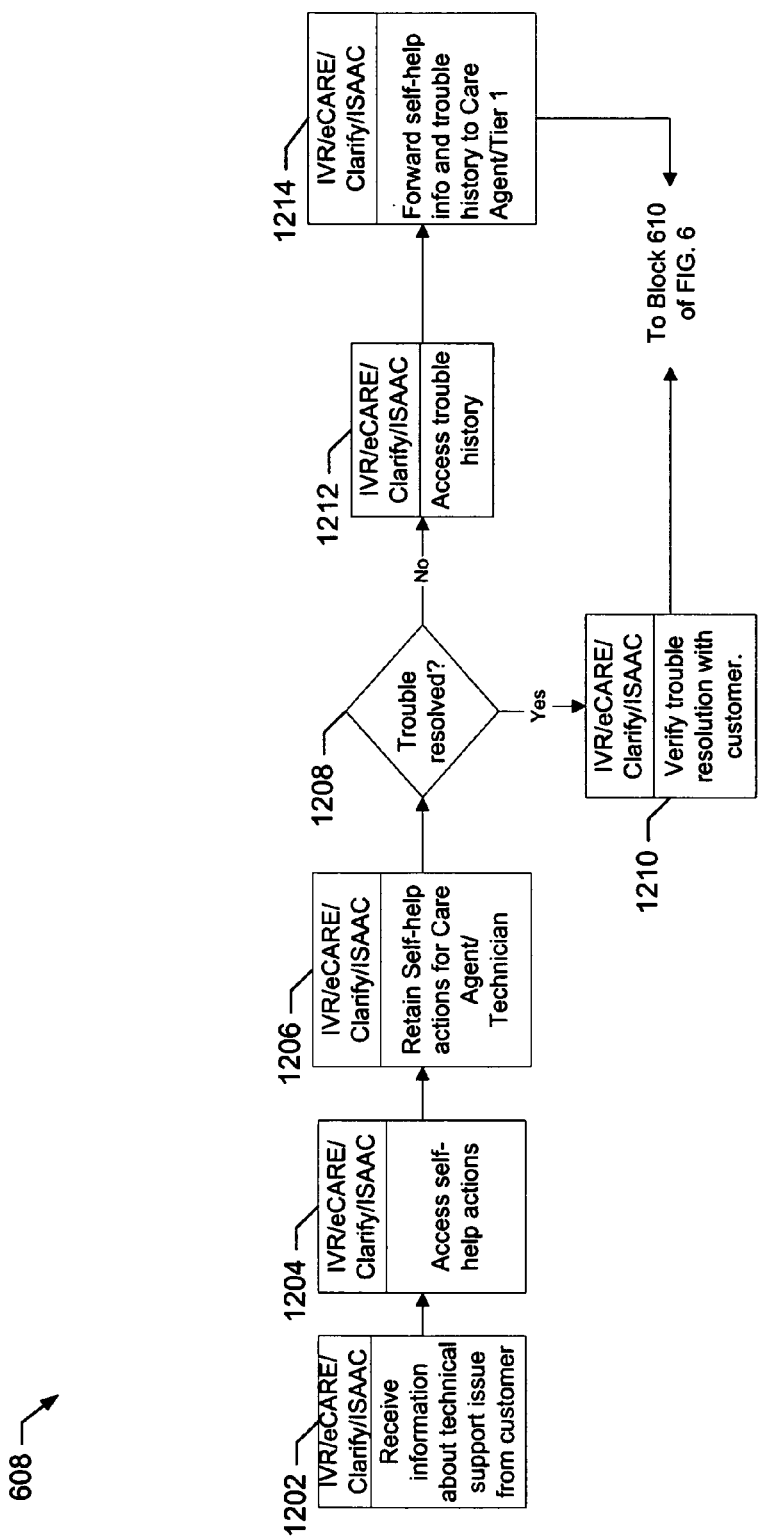

FIG. 12 is a flow diagram illustrating a more detailed method for implementing block 608 of FIG. 6, which assesses the customer's trouble report and provides self-help solutions for solving the customer's problem. The IVR server 146, the eCare server, the ISAAC server, or the Clarify server receives information about the technical support issue from the customer (block 1202). Then, the IVR server 146, the eCare server, the ISAAC server, or the Clarify server provides self-help actions to the customer and determines (block 1204). For example, the self-help actions may include validating that cables are securely connected to devices at the consumer location, validating that the customer can connect to and authenticate with directory servers, etc. The self-help actions may be performed by the customer or may be performed by software installed on devices at the consumer location. A list of self-help actions performed are stored for transmission to a call center agent (block 1206). The IVR server 146, the eCare server, the ISAAC server, or the Clarify server then determines if the self-help actions have resolve the customers problem (block 1208). For example, after performing one or more self-help actions, the IVR server 146 may ask the user if the actions have resolved the problem. If the self-help actions have resolved the problem, the contact is ended or the customer is forwarded to a call center agent to verify the call resolution (block 1210). Control then proceeds to block 610 of FIG. 6. If the customer indicates that the self-help actions have not resolved the problem, the request handler 202 of the CCCS 148 retrieves the history of call center contacts for the customer (block 1212). For example, the history may be stored in a Clarify database and the data aggregator/translator 206 may retrieve the data via the data interface 210. After the history has been retrieved, contact is routed to a call center agent along with the history information (block 1214). Control then proceeds to block 610 of FIG. 6.

Figure 13:
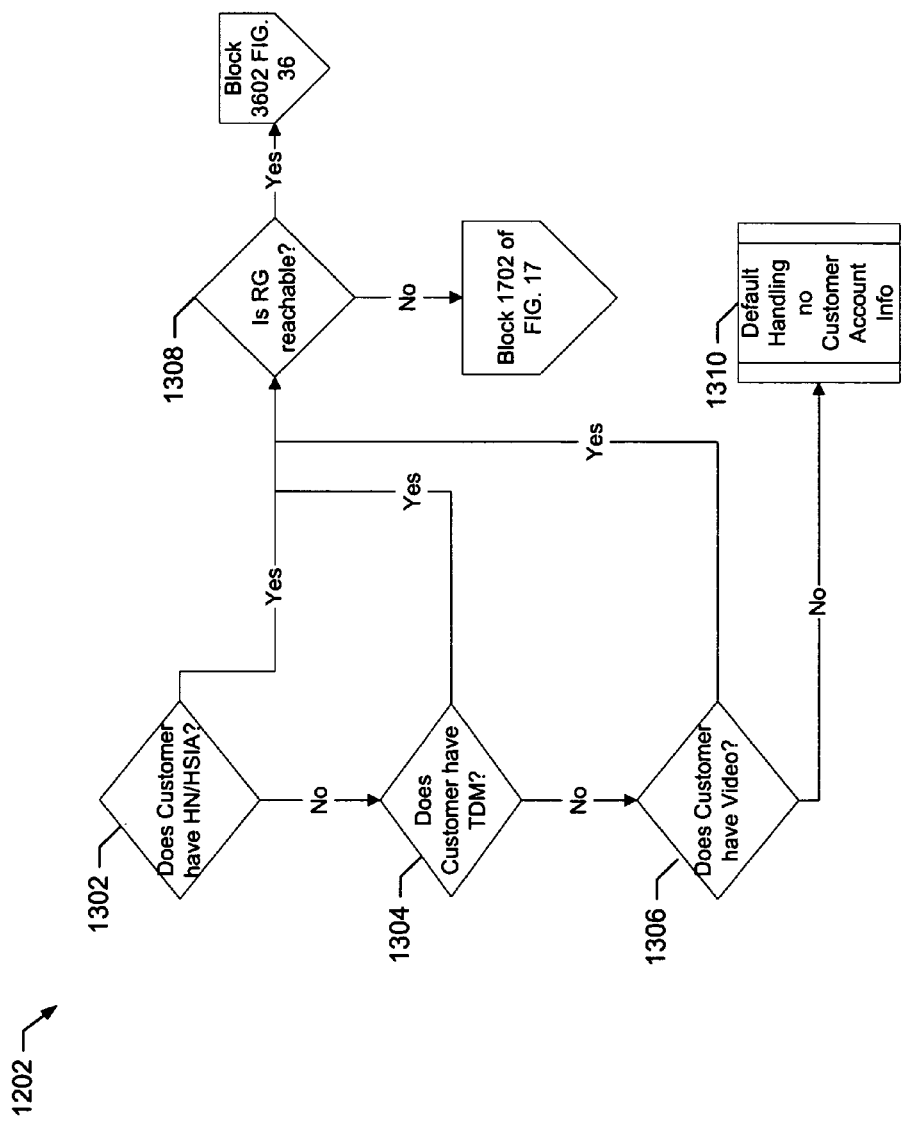

FIG. 13 is a flow diagram illustrating a more detailed method for implementing block 1202 of FIG. 12, which retrieves further information about a customer's support request. The ISAAC server, the Clarify server, the eCare server, or the IVR server uses available data sources to determine if the customer has a home network (HN) or high speed Internet access (HSIA) (1302). If the customer has HN or HSIA, the agent, the CMS, or the ISAAC server determines if a residential gateway on the customer's network is reachable (block 1308). If the residential gateway is reachable, control proceeds to block 3002 of FIG. 3. If the residential gateway is not reachable, control proceeds to block 1702 of FIG. 17.

Returning to block 1302, if the customer does not have a HN or HSIA, the ISAAC server, the Clarify server, the eCare server, or the IVR server uses available data sources to determine if the customer has TDM (block 1304). If the customer has TDM, control proceeds to block 1308. If the customer does not have TDM, the ISAAC server, the Clarify server, the eCare server, or the IVR server uses available data sources to determine if the customer has video service (e.g., IP television service) (block 1306). If the customer has video service, control proceeds to block 1308. If the customer does not have video service, the call is routed to a general agent because the customer does not have any of the services offered by the business associated with the call center (block 1310).

Figure 14:
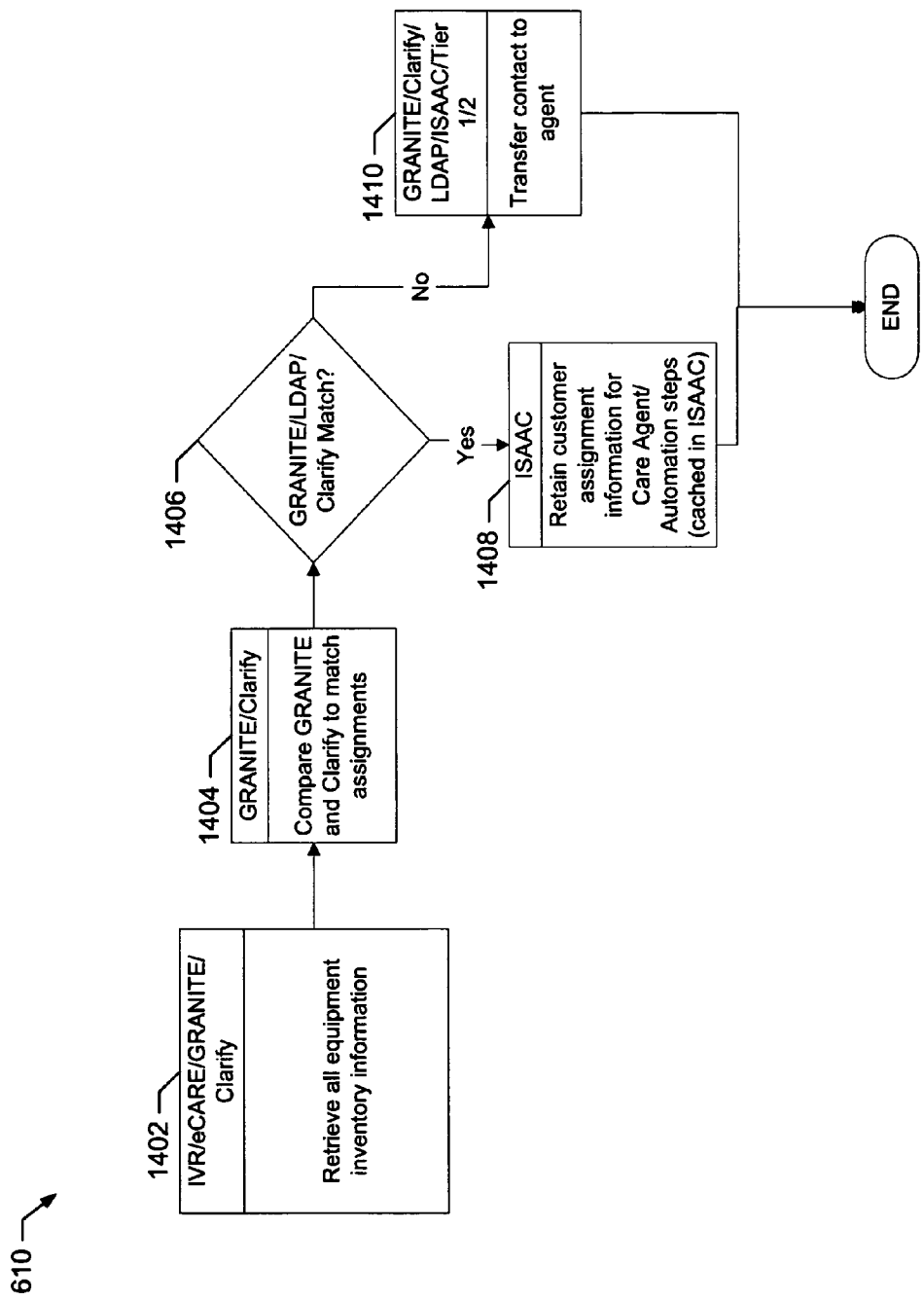

FIG. 14 is a flow diagram illustrating a more detailed method for implementing block 610 of FIG. 6, which validates the equipment inventory listed in the GRANITE server's database with the inventory listed in the Clarify server's database. The IVR server, eCare server, the GRANITE server, and/or the Clarify server retrieves a list of equipment that is associated with the customer (block 1402). For example, the list may include the DSLAM, DSLAM port, Virtual Local Area Network identifier, cable pair identifier, etc. Then, the ISAAC server compares the data retrieved from the GRANITE server database with the data retrieved from the Clarify server database (block 1404). The ISAAC server determines if the data from the two databases matches (block 1406). If the data from the two databases matches, the ISAAC server retains the retrieved data for a call agent (block 1408) and control proceeds to block 506 of FIG. 5. If the data from the two databases does not match, the ISAAC server transfers the contact an agent that is trained in handling equipment inventory discrepancies (block 1410) and control proceeds to block 506 of FIG. 5.

Section II—Analyze Request and Data (Block 506)

Section II provides further detail for block 506 of FIG. 5. After customer information has been gathered by the CCCS 148 in block 504, the customer data and the service network are analyzed for problems in block 506. As noted above, in blocks 508-512, the customer's problem is diagnosed, the call may be routed to an appropriate agent, and the resolution of the call is confirmed.

After the customer data has been gathered in block 504, the request handler 202 and the component handler 218 determine whether the residential gateway, the customer's STB or other CPE, and/or the local area network (LAN) associated with the customer can be reached from the call center (block 1502). If the residential gateway, the customer's STB, and/or the LAN can be reached, the request handler 202 and the component handler 218 in conjunction with the component request monitor 220 determines if there are any network outages (block 1504). If there are no known network outages, the request handler 202 and the component handler 218 verify network performance (block 1506). If the network performance is sufficient, the request handler 202 and the component handler 218 determine whether data service to the customer is performing appropriately (block 1508). If the data service to the customer is performing appropriately control proceeds to block 508 of FIG. 5 to continue diagnosing and isolating the customer's problem. Blocks 1502 to 1508 are described in further detail below.

Figure 15:
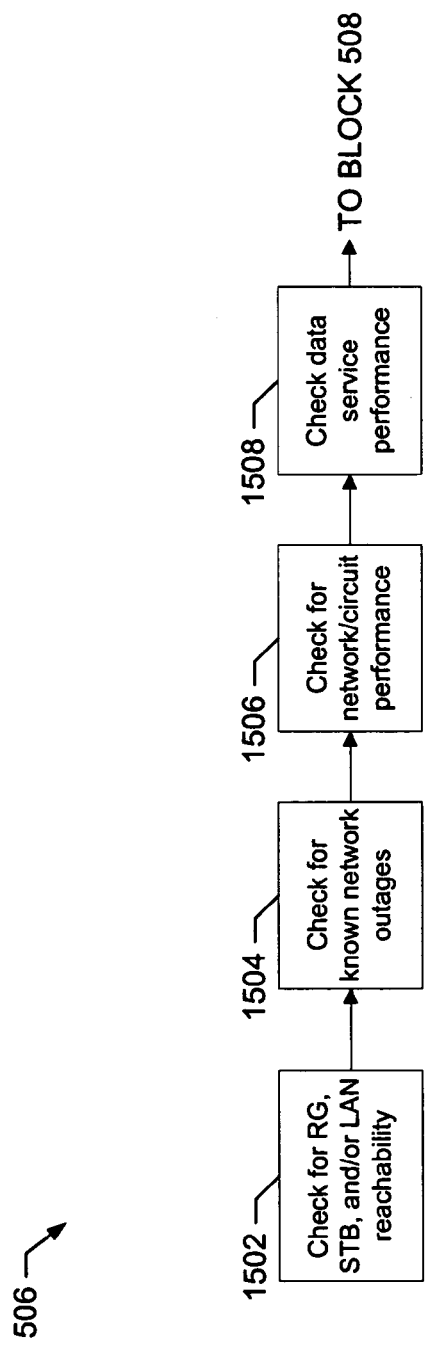
Figure 16:
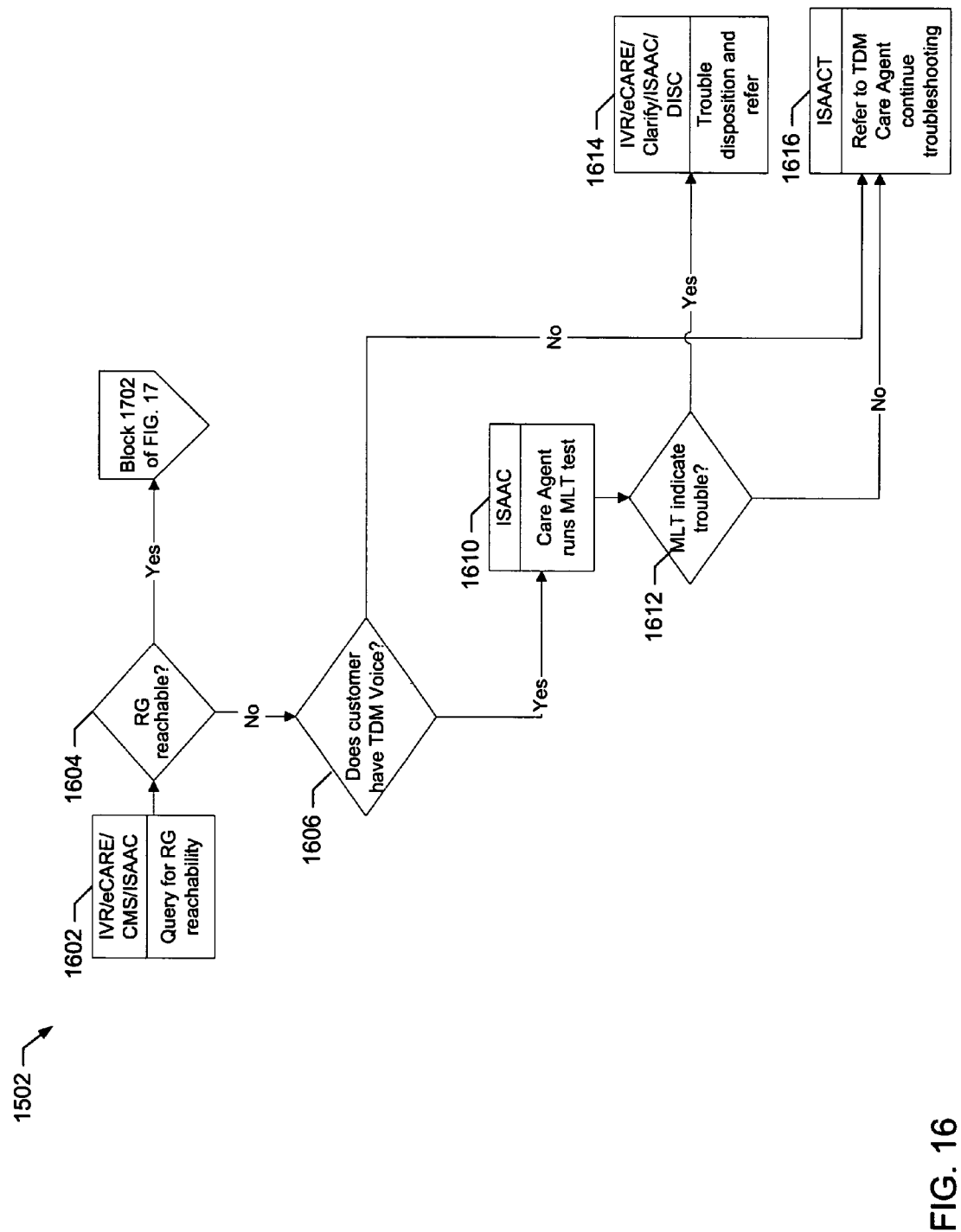

FIG. 16 is a flow diagram illustrating a more detailed method for implementing block 1502 of FIG. 15. The IVR server, eCare server, component management system (CMS), or the ISAAC server query the residential gateway to see if it can be reached from the center, which indicates that it able to communicate with the data network (block 1604). For example, the request handler 202 and the component handler 218 query the residential gateway via data network 142. Based on whether the residential gateway responds to the query, the ISAAC server determines if the residential gateway is reachable (block 1604). If the residential gateway is reachable, control proceeds to block 1702 of FIG. 17. If the residential gateway is not reachable, the ISAAC server determines if the customer has time division multiplexed (TDM) voice service (block 1606). If the customer does not have TDM voice service, the contact is routed to a TDM service agent to continue troubleshooting with the customer (block 1616). If the customer has TDM voice service, the ISAAC server refers the contact to an agent to run metallic line testing (MLT) (block 1610). If the MLT does not indicate a problem, the call is routed to a TDM service agent to continue troubleshooting with the customer (block 1616). If the MLT indicates a problem, the problem is recorded and the contact is referred to an agent or business that is capable of handling problems with the MLT (block 1614).

Figure 17:
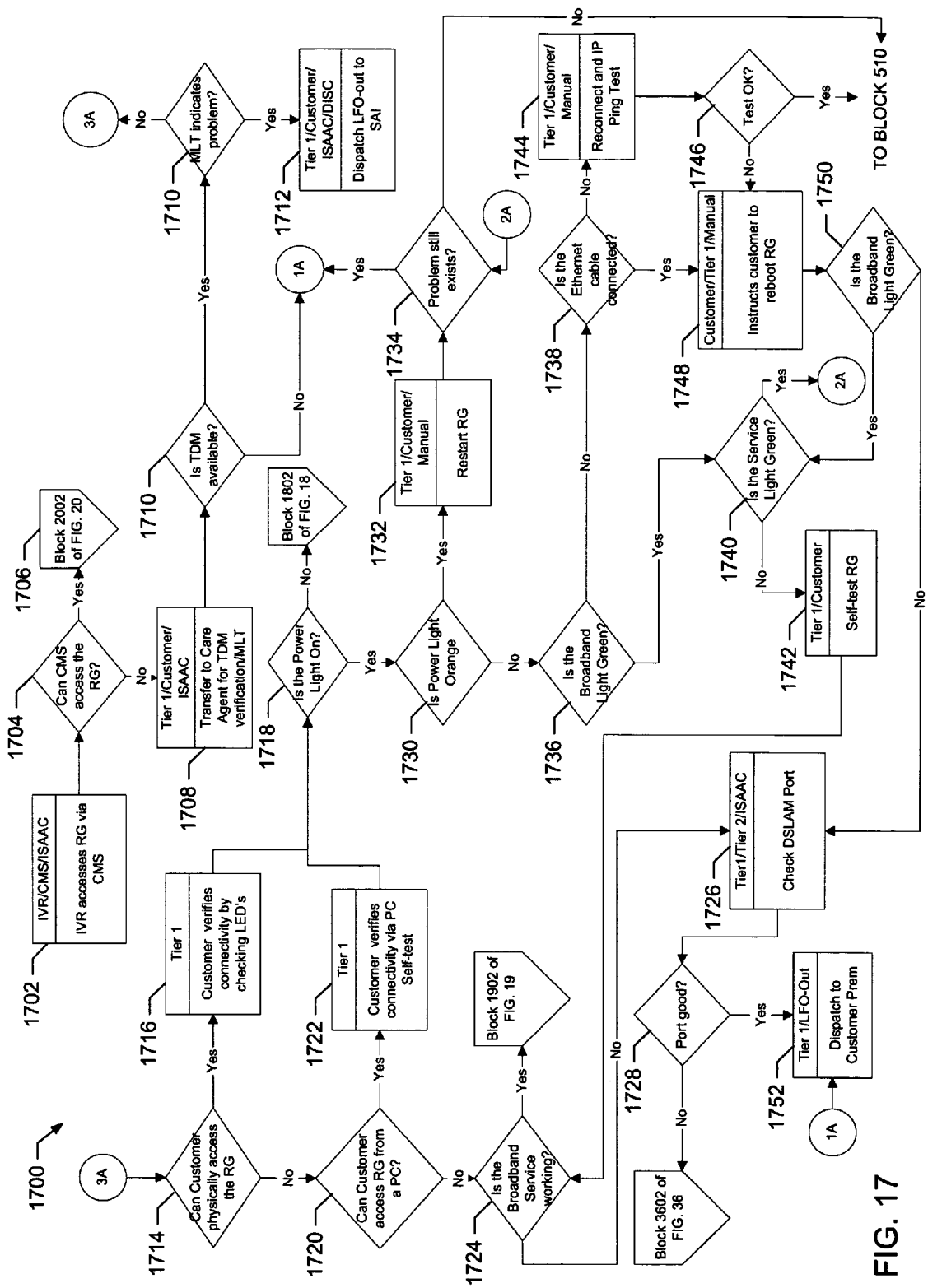

FIG. 17 is a flow diagram illustrating further detail of a process 1700 for troubleshooting a connection with a residential gateway after verifying that the residential gateway is reachable in FIG. 16. In the example method, the IVR server attempts to access the residential gateway via the component management system (block 1702). If the CMS can access the residential gateway, control proceeds to block 2002 of FIG. 20. If the CMS cannot access the residential gateway, the contact is routed to an agent to verify the TDM and perform an MLT (block 1708).

The agent first determines if the TDM is available (block 1710). If the TDM is available, the agent determines if the MLT indicates a problem (block 1710). If the MLT indicates a problem, a technician from a local field office (LFO) is dispatched to verify and repair the problem (block 1712). If the MLT does not indicate a problem, control proceeds to block 3A.

Returning to block 1710, if the TDM determines that the TDM is available, control proceeds to block 1A.

At block 3A, the call center agent asks the customer whether they can physically access the residential gateway (block 1714). If the customer can access the residential gateway, the agent asks the customer to report which light emitting diodes (LED) are illuminated on the residential gateway (block 1716). Control then proceeds to block 1718.

If the customer cannot access the residential gateway, the agent asks the customer if they can access the residential gateway from a personal computer (PC) (block 1720). If the customer can access the residential gateway from a PC, the agent instructs the customer to obtain the LED status of the residential gateway using software running on the PC that can display the LED status (block 1722). Control then proceeds to block 1718.

If the customer cannot access the residential gateway from a PC, the agent asks the customer whether their broadband connection working properly (block 1724). If the customer's broadband connection is working properly, control proceeds to block 1902 of FIG. 19. If the customer's broadband connection is not working properly, an agent or the ISAAC server checks the DSLAM to which the customer should be connected (block 1726). Control then proceeds to block 1728.

Returning to block 1718, after the customer has indicated which LEDs are illuminated on the residential gateway, the agent determines if the LED that indicates power to the device is illuminated (block 1718). If the LED that indicates power is not illuminated, control proceeds to block 1802 of FIG. 18. If the LED that indicates power is illuminated, the agent determines if the LED that indicates power is orange in color (block 1730). If the LED that indicates power is orange in color, the agent instructs the customer to power cycle the residential gateway (block 1732). Control then proceeds to block 1734. If the LED that indicates power is not orange in color, the agent determines if the LED that indicates that a broadband connection is active is green in color (block 1736). If the LED that indicates that a broadband connection is active is not green in color, control proceeds to block 1738.

If the LED that indicates that a broadband connection is active is green in color, the agent determines if the LED that indicates that service is available is green in color (block 1740). If the LED that indicates that service is available is green in color, control proceeds to block 2A. If the LED that indicates that service is available is not green in color, the agent instructs the customer to perform a residential gateway self-test procedure (block 1742). Control then proceeds to block 1727, which has been previously described.

Returning to block 1734, after the residential gateway has been restarted, the agent and/or the customer determines whether the original problem still exists (block 1734). If the problem still exists, control proceeds to block 2A. If the problem no longer exists, control proceeds to block 510 of FIG. 5 to record the results of the contact and to confirm that the issue is resolved.

Returning to block 1738, after the agent determines that the LED that indicates that a broadband connection is active is not green, the agent instructs the customer to determine if the Ethernet cable is securely connected (block 1738). If the Ethernet cable is not securely connected, the agent instructs the customer to connect the Ethernet cable and the agent sends a ping request to the residential gateway (block 1744). The agent determines if the ping request was successfully received (block 1746). If the ping request was not successfully received, control proceeds to block 1748, which is described below. If the ping request was successfully received, control proceeds to block 510 of FIG. 5 to record the results of the contact and to confirm that the issue is resolved.

If the Ethernet cable is securely connected, the agent instructs the customer to reboot the residential gateway by pressing a reset button or by power-cycling the device (block 1748). The agent then asks the customer to verify whether the LED that indicates that a broadband connection is active is now green in color (block 1750). If the LED that indicates that a broadband connection is active is now green in color, control proceeds to block 1740, which has been previously described. If the LED that indicates that a broadband connection is active is not green in color, control proceeds to block 1726, which has been previously described.

Returning to block 1728, after checking the port on the DSLAM associated with the customer, the agent determines if the port is functioning properly (block 1728). If the port is functioning properly, control proceeds to block 1752. If the port is not functioning properly, control proceeds to block 3002 of FIG. 30.

Returning to block 1A and block 1752, if it is determined that a port on the DSLAM associated with the customer is not functioning properly, the TDM service is unavailable, or problems still exist after rebooting the residential gateway, a technician is dispatched to visit the customer's location (block 1752). A technician may be immediately dispatched or may be scheduled to visit the customer the next time that a technician is in the area.

Figure 18:
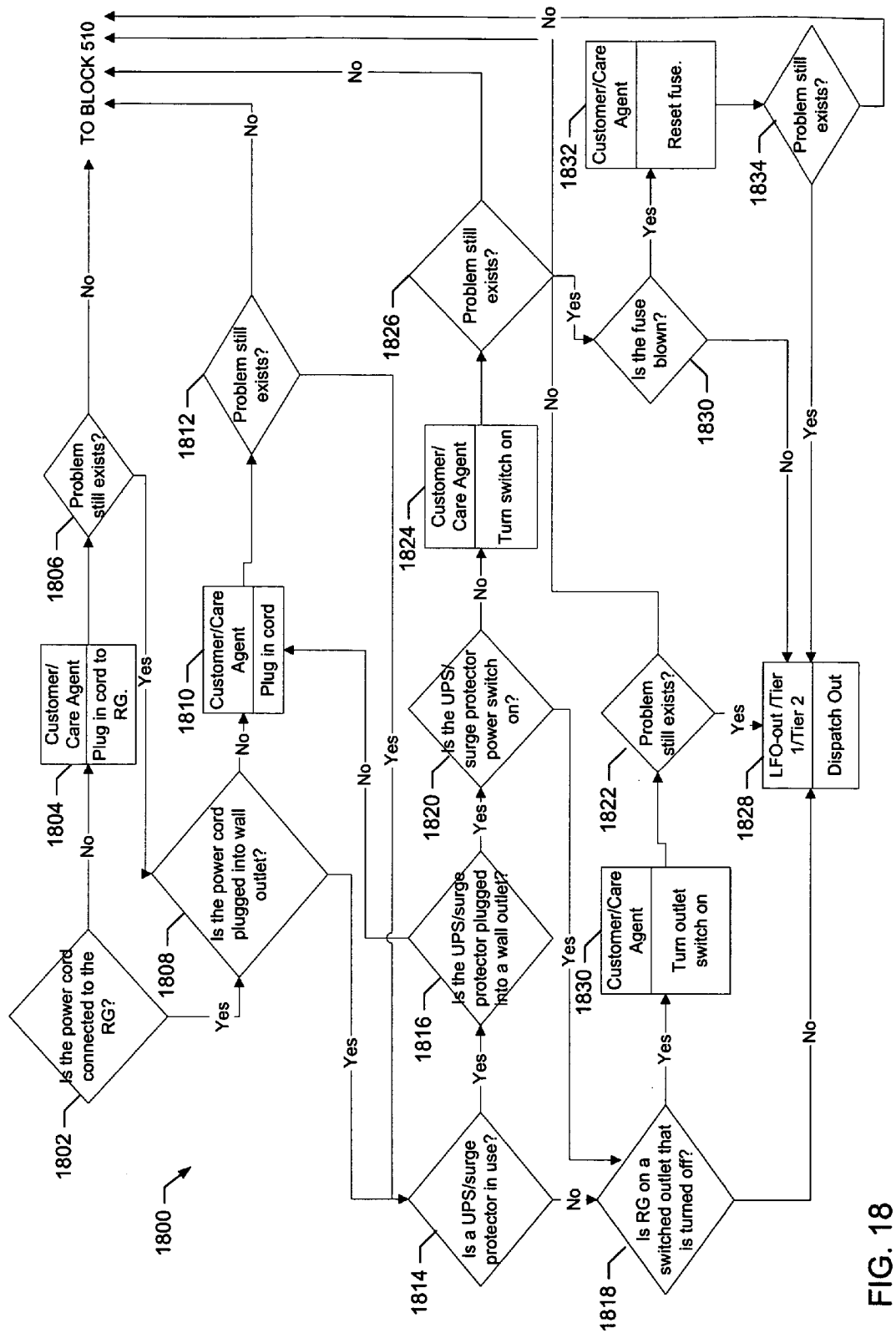

FIG. 18 is a flow diagram illustrating further detail of a process 1800 for troubleshooting power problems on the residential gateway. The method of FIG. 18 may be performed following block 1718 of FIG. 17. The agent first instructs the customer to verify that the power cable for the residential gateway is attached (block 1802). If the power cable is not attached, the agent instructs the customer to attach the plug (block 1804). Then, the agent and the customer determine if the problem still exists (block 1806). If the problem not longer exists, control proceeds to block 510 of FIG. 5 to record the results of the contact and to confirm that the issue is resolved. If, after attaching the plug, the problem still exists, control proceeds to block 1808, which is described below.

If the power cable is attached, the agent instructs to customer to check if the power cord is plugged into the wall (block 1808). If the cord was not plugged into the wall, the agent instructs the customer to plug in the cord (block 1810). Control then proceeds to block 1812.

If the cord was plugged into the wall, the agent asks the customer if an uninterruptible power supply (UPS) or a surge protector is in use (block 1814). If a UPS or a surge protector is in use, control proceeds to block 1816. If not UPS or surge protector is in use, control proceeds to block 1818.

Returning to block 1812, after the customer plugs in the power cord, the agent and the customer determine if the problem still exists (block 1812). If the problem no long exists, control proceeds to block 510 of FIG. 5 to record the results of the contact and to confirm that the issue is resolved. If the problem still exists, control proceeds to block 1814, which has been previously described.

Returning to block 1816, after the customer indicates that a UPS or a surge protector is connected to the residential gateway, the agent instructs the customer to check if the UPS or surge protector is plugged into the wall (block 1816). If the UPS or surge protector is not plugged into the wall, control proceeds to block 1810, which has been previously described. If the UPS and/or the surge protector are plugged into the wall, the agent instructs the customer to determine if the UPS and/or surge protector power switch is on (block 1820). If the UPS power switch is turned on, control proceeds to block 1818. If the UPS power switch is not turned on, the agent instructs the customer to turn the power switch on (block 1824). Control then proceeds to block 1826.

Returning to block 1818, after the customer indicates that no UPS or surge protectors are in use, the agent instructs the customer to determine if the outlet that the residential gateway is plugged into is controlled by switch (block 1818). If the outlet is not controlled by a switch, a technician from the LFO must be dispatched to the customer location (block 1828). In addition, the residential gateway may need to be returned to the service provider for repairs. If the outlet is controlled by a switch, the agent instructs the customer to turn the switch for the outlet on (block 1830. Control then proceeds to block 1822.

Returning to block 1822, after turning on the switch for the outlet, the customer and the agent determine if the problem still exists (block 1822). If the problem still exists, control proceeds to block 1828, which has been previously described. If the problem does not still exist, control proceeds to block 510 of FIG. 5 to record the results of the contact and to confirm that the issue is resolved.

Returning, to block 1826, after the customer turns on the switch for the UPS and/or surge protector, the customer and the agent determine if the problem still exists (block 1826). If the problem does not still exist, control proceeds to block 510 of FIG. 5 to record the results of the contact and to confirm that the issue is resolved. If the problem still exists, the agent instructs the customer to determine if a fuse is blown (block 1830). If a fuse is not blown, control proceeds to block 1828. If a fuse is blown, the agent instructs the customer to reset the fuse (block 1832). After resetting the fuse, the customer and the agent determine if the problem still exists (block 1834). If the problem does not still exist, control proceeds to block 510 of FIG. 5 to record the results of the contact and to confirm that the issue is resolved. If the problem still exists, control proceeds to block 1828, which has been previously described.

Figure 19:
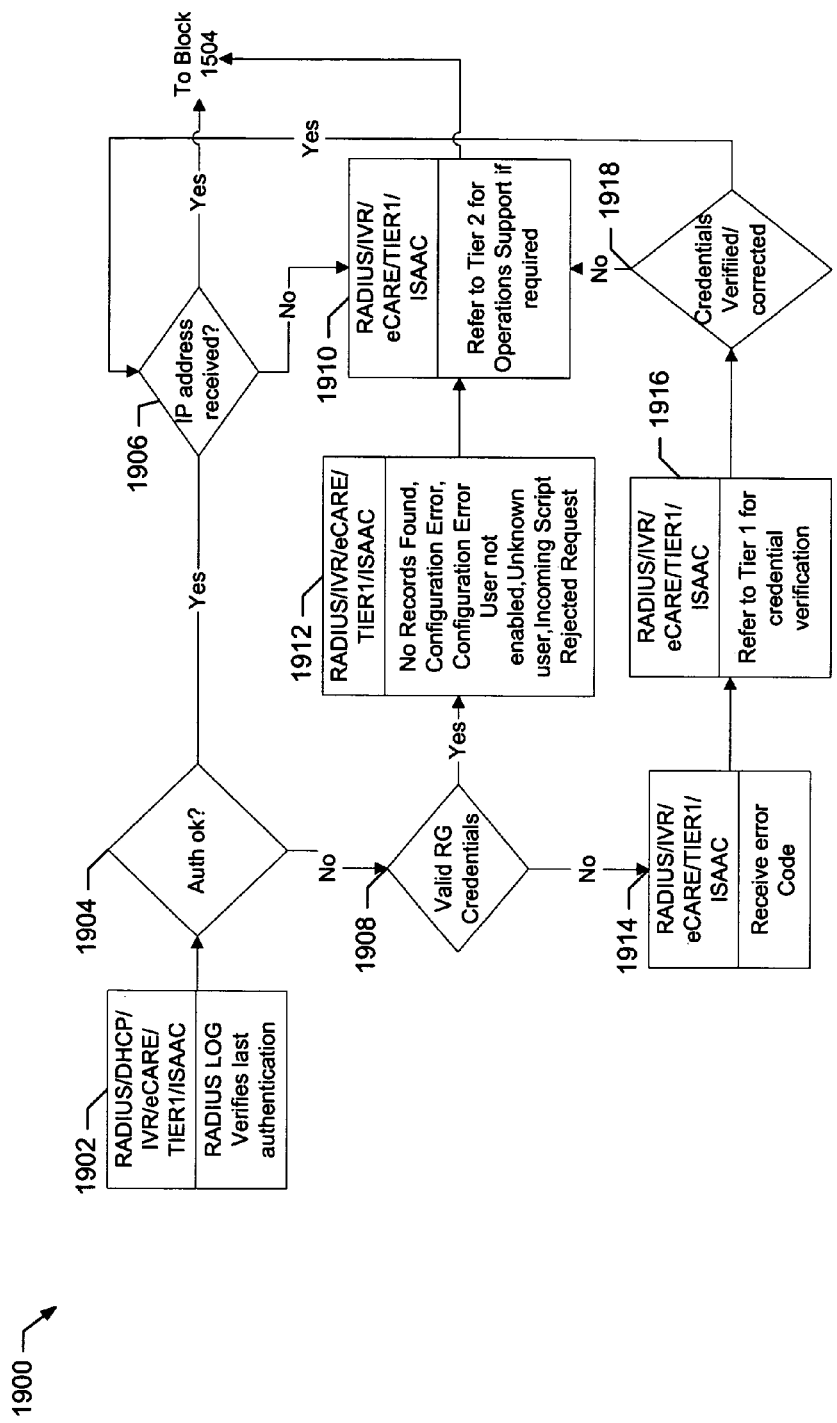

FIG. 19 is a flow diagram illustrating further detail of a process 1900 for determining if a customer is properly authenticated in the service provider's network. The method may be performed if it is determined that the broadband service is working properly in block 1724 of FIG. 17. An agent, the IVR server, or the ISAAC server checks the logs of a remote authentication dial-in user service (RADIUS) or a dynamic host configuration protocol (DHCP) to determines if the customer's last authentication to the service provider was successful (block 1902 and 1904). If the last authentication was successful, control proceeds to block 1906. If the last authentication was not successful control proceeds to block 1908.

Turning to block 1906, if the authentication was successful, the agent, the IVR server, or the ISAAC server determines if an IP address was received by the customer's equipment (block 1906). If an IP address was received by the customer's equipment, control proceeds to block 1504 of FIG. 15. If an IP address was not received by the customer's equipment, the contact is routed to an agent for further troubleshooting starting at block 1504 (block 1910).

Returning to block 1908, if the last authentication was not successful, the agent, the IVR server, or the ISAAC server determines if the residential gateway credentials were valid (block 1908). For example, the residential gateway may supply a username, a password, and/or a serial number. If the residential gateway credentials were valid, the agent, the IVR server, or the ISAAC server determines the error that prevented authentication (block 1912). Control then proceeds to block 1910, which has been previously described. If the residential gateway credentials are invalid, the agent, the IVR server, or the ISAAC server receives an error code associated with the invalid credentials (block 1914). The agent, the IVR server, or the ISAAC server then verifies the correct credentials (block 1916). The agent, the IVR server, or the ISAAC server then determines if the credentials have been verified or corrected (block 1918). If the credentials have been verified or corrected, the contact is routed to an agent for further troubleshooting starting at block 1504. If the credentials have not been verified, control proceeds to block 1910.

Figure 20:
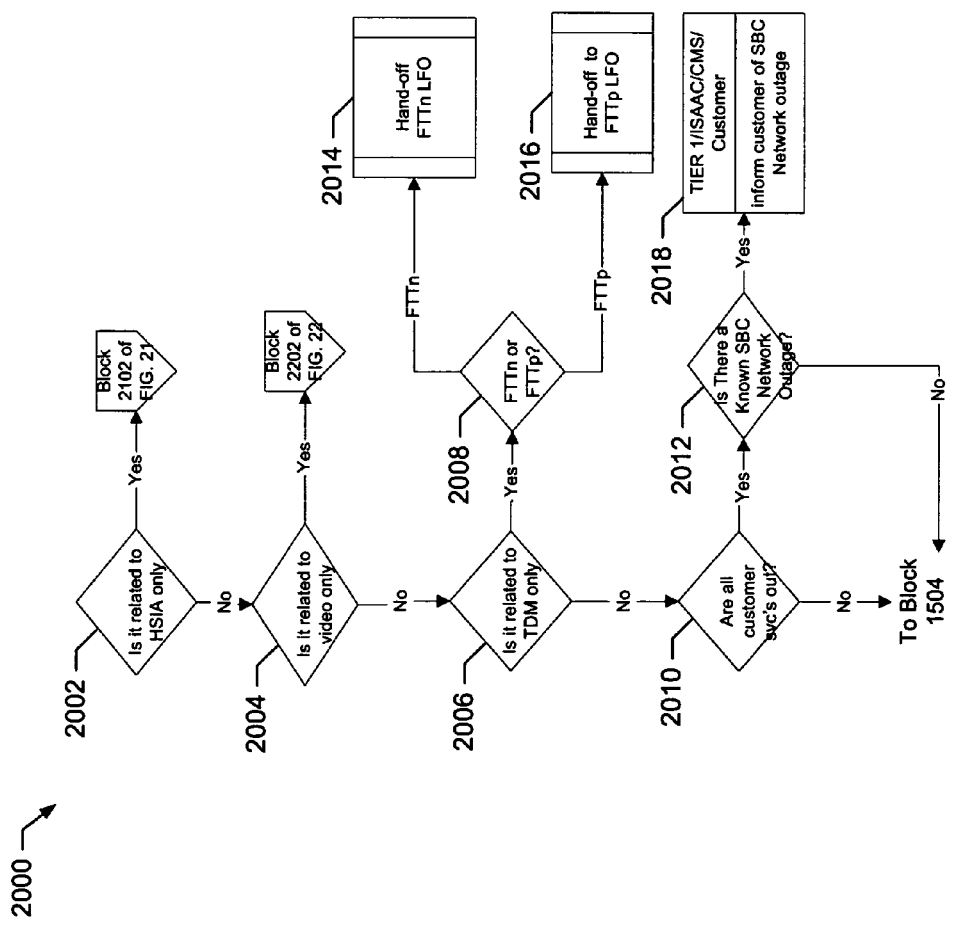

FIG. 20 is a flow diagram illustrating further detail of a process 2000 to begin isolating the location of a problem affecting the customer. The method of FIG. 20 may be conducted after it is determined that the CMS can access the residential gateway of the customer. The agent, the IVR server, or the ISAAC server and the customer determine if the problem is related to HSIA only (block 2002). If the problem is related to HSIA only, control proceeds to block 2102 of FIG. 21.

If the problem is not only related to HSIA, the agent, the IVR server, or the ISAAC server and the customer determine if the problem is only related to video (block 2004). If the call is only related to video, control proceeds to block 2202 of FIG. 22.

If the problem is not related to video only, the agent, the IVR server, or the ISAAC server and the customer determine if the problem is related to TDM only (block 2006). If the problem is related to TDM only, control proceeds to block 2008.

If the problem is not related to TDM only, the agent, the IVR server, or the ISAAC server and the customer determine if all services to the customer are unavailable (block 2010). If all services to the customer are not unavailable, the contact is routed to an agent for further troubleshooting starting at block 1504. If all of the customer's services are unavailable, control proceeds to block 2012.

Returning to block 2008, the agent, the IVR server, or the ISAAC server determines from inventory data if the provider supplies fiber-optic cabling to the neighborhood (FTTn) or fiber-optic cabling to the premises (FTTp) (block 2008). If the provider supplies FTTn, the contact is routed to an LFO that is assigned to handle support for customers that have copper wiring to their premises (block 2014). If the provider supplies FTTp, the contact is routed to an LFO that is assigned to handle support for customers that have FTTp (block 2016).

Returning to block 2012, after determining if all of the customers services are unavailable, the agent, the IVR server, or the ISAAC server determines if there is a known network outage (block 2012). If there is not a known network outage, the contact is routed to an agent for further troubleshooting starting at block 1504. If there is a known network outage, the call is routed to an agent or the ISAAC server to inform the customer of the network outage (block 2018).

Figure 21:
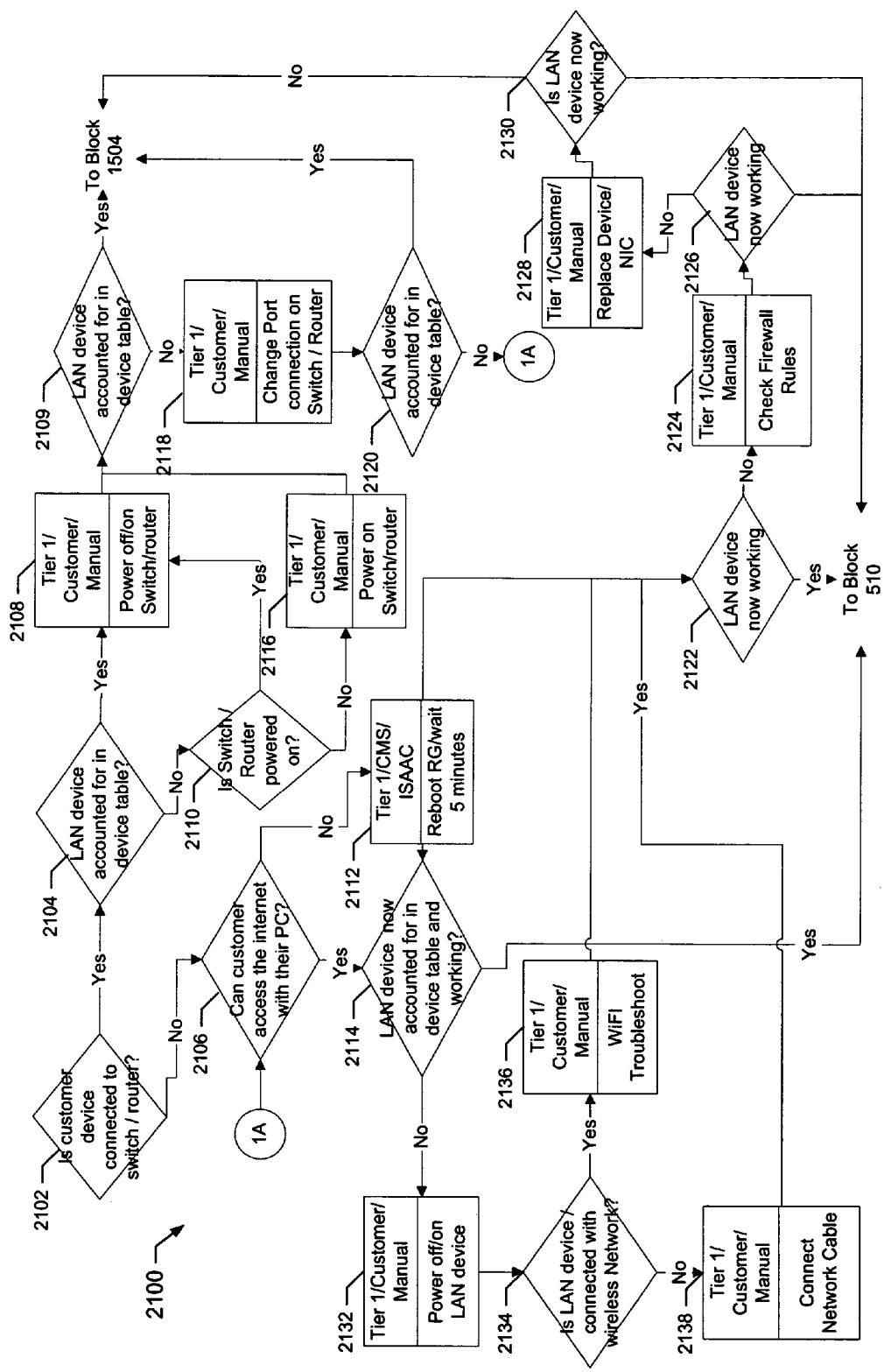

FIG. 21 is a flow diagram illustrating further detail of a process 2100 to determine if devices associated with the HSIA service are functioning properly. The method of FIG. 21 may be conducted after it is determined that the customer is having trouble with HSIA only in block 2002 of FIG. 20. The agent, the CMS, or the ISAAC server instruct the customer to check if their computer or other device is connected to a switch or router (block 2102). If the device is connected to a switch or router, control proceeds to block 2104. If the device is not connected to a switch or router, control proceeds to block 2106.

Turning to block 2104, the agent, the CMS, or the ISAAC server determines if the device is accounted for in the network device table (block 2104). If the device is accounted for in the network device table, the agent instructs the customer to power cycle the switch or router (block 2108). Control then proceeds to block 2109. If the switch or router is not accounted for in the network device table, control proceeds to block 2110.

Turning to block 2110, after determining that the device is not accounted for in the device table, the agent, the CMS, or the ISAAC server asks the customer if the switch or router is powered on (block 2110). If the switch or router is turned on, control proceeds to block 2108. If the switch or router is not turned on, the agent, the CMS, or the ISAAC server instructs the customer to turn on the switch or router (block 2116). Control then proceeds to block 2109.

Returning to block 2109, after the switch or router has been powered on and/or the device has been power cycled, the agent, the CMS, or the ISAAC server determines if the switch or router is accounted for in the device table (block 2109). If the device is accounted for in the device table, control proceeds to block 1504 of FIG. 15. If the device is not accounted for in the device table, the agent, the CMS, or the ISAAC server instructs the customer to change the port connection on the switch or router (block 2118). After the customer changes the port connection on the switch or router, the agent, the CMS, or the ISAAC server determines if the device is accounted for in the device table (block 2120). If the device is account for, control proceeds to block 1504. If the device is not accounted, control proceeds to block 1A.

Returning to block 2106, after determining the customer's device is not connected to a switch or router, the agent, the CMS, or the ISAAC server asks the customer if they can access the Internet with their computer (block 2106). If the customer cannot access the Internet with their computer, control proceeds to block 2112. If the customer can access the Internet with their computer, control proceeds to block 2114.

Turning to block 2112, after determining that the customer cannot access the Internet from their computer, the agent, the CMS, or the ISAAC server instructs the customer to reboot the residential gateway and wait five minutes (block 2112). Then, the agent, the CMS, the ISAAC server, or the customer determines if the device is now working (block 2122). If the device is working, control proceeds to block 510 of FIG. 5. If the device is not working, the CMS, the ISAAC server instructs the customer to check firewall rules on a switch or router at the customer's location (block 2124). Then, the agent, the CMS, the ISAAC server, or the customer determines if the device is now working (block 2126). If the device is working, control proceeds to block 510 of FIG. 5. If the device is not working, the agent, the CMS, or the ISAAC server instructs the customer to replace their network card or to use another device (block 2128). Then, the agent, the CMS, the ISAAC server, or the customer determines if the device is now working (block 2130). If the device is working, control proceeds to block 510 of FIG. 5. If the device is not working, control proceeds to block 1504 of FIG. 15.

Returning to block 2114, after determining that the customer can access the Internet with their computer, the agent, the CMS, or the ISAAC server determines if the device is accounted for in the device table (block 2114). If the device is accounted for in the device table, control proceeds to block 510 of FIG. 5. If the device is not accounted for in the device table, the agent, the CMS, or the ISAAC server instructs the customer to power cycle the device (block 2132). Then, the agent, the CMS, or the ISAAC server asks the customer whether the device is a wireless network device or a wired network device (block 2134). If the device is a wireless network device, the agent, the CMS, or the ISAAC server conducts wireless network specific troubleshooting with the customer (block 2136). Control then proceeds to block 2122. If the device is a wired network device, the agent, the CMS, or the ISAAC server conducts wired network specific troubleshooting with the customer (block 2138). Control then proceeds to block 2122.

Figure 22:
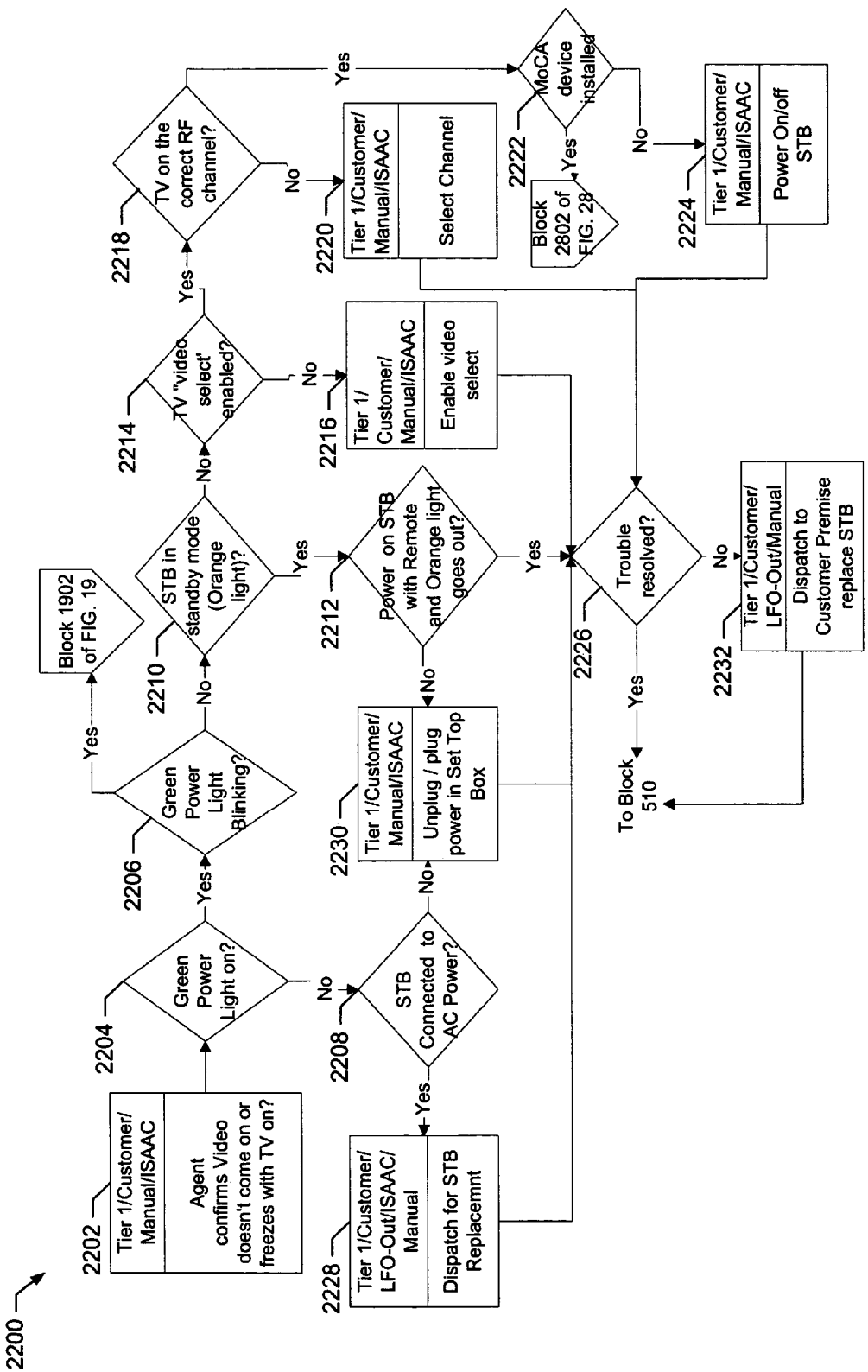

FIG. 22 is a flow diagram illustrating further detail of a process 2200 to determine if devices associated with the video service are functioning properly. The method of FIG. 22 may be conducted after it is determined that the customer is having trouble with the video service in block 2004 of FIG. 20. The agent or the ISAAC server asks the customer to confirm that the video doesn't display on a television or freezes when it is displayed (block 2202). The agent or the ISAAC server then asks the customer whether the green power light is illuminated on the STB (block 2204). If the green power light is not illuminated, control proceeds to block 2208. If the green power light is illuminated, the agent or the ISAAC server asks the customer whether the green power light is blinking (block 2206). If the green power light is blinking, control proceeds to block 1902 of FIG. 19. If the green power light is not blinking, the agent or the ISAAC server asks the customer whether the status light is illuminated orange indicating that the STB is in standby mode (block 2210). If the status light is illuminated orange, control proceeds to block 2212.

If the status light is not illuminated orange, the agent or the ISAAC server instructs the customer to verify whether the television is set for the correct video input mode (block 2214). If the television is not set to the correct video input mode, control proceeds to block 2216. If the television is set to the correct video input mode, the agent or the ISAAC server instructs the customer to verify that the television is on the correct radio frequency (RF) channel to receive the signal from the STB (block 2218). If the television is not on the correct RF channel, control proceeds to block 2220.

If the television is on the correct RF channel, the agent or the ISAAC server instructs the customer to determine if a multimedia over coax (MoCA) device is installed to receive video content (block 2222). If a MoCA device is installed, control proceeds to block 2802 of FIG. 28 to verify that the MoCA device is functioning properly. If a MoCA device is not installed, the agent or the ISAAC server instructs the customer to power cycle the STB (block 2224). Control then proceeds to block 2226.

Returning to block 2208, after determining that the green power light is not illuminated, the agent or the ISAAC server instructs the customer to verify that the STB is connected to the power adapter and that the adapter is plugged into the wall (block 2208). If the STB is connected to the power adapter, a technician is dispatched to replace the STB (block 2228). Once the STB has been replaced, control proceeds to block 2226. If the STB is not connected to the power adapter, the agent or the ISAAC server instructs the customer to power cycle the STB (block 2230). Control then proceeds to block 2226.

Returning to block 2212, after determining that the status light of the STB is illuminated orange, the agent or the ISAAC instructs the customer to power on the STB with the remote and to verify that the orange light is no longer illuminated (block 2212). If the orange light is no longer illuminated, control proceeds to block 2226. If the orange light is still illuminated, control proceeds to block 2230, which has been previously described.

Returning to block 2216, after determining that the correct television video mode is not selected, the agent or the ISAAC instructs the customer to select the correct television video mode (block 2216). Control then proceeds to block 2226.

Returning to block 2220, after determining that the incorrect RF channel is selected on the television, the agent or the ISAAC instructs the customer to select the proper channel (block 2220). Control then proceeds to block 2226.

Returning to block 2226, after performing a variety of troubleshooting procedures, the agent or the ISAAC asks the customer whether the trouble has been resolved (block 2226). If the trouble has been resolved, control proceeds to block 510 of FIG. 5. If the trouble has not been resolved, a technician is dispatched to the customer premise to replace the STB (block 2232). Control then proceeds to block 510.

Figure 23:
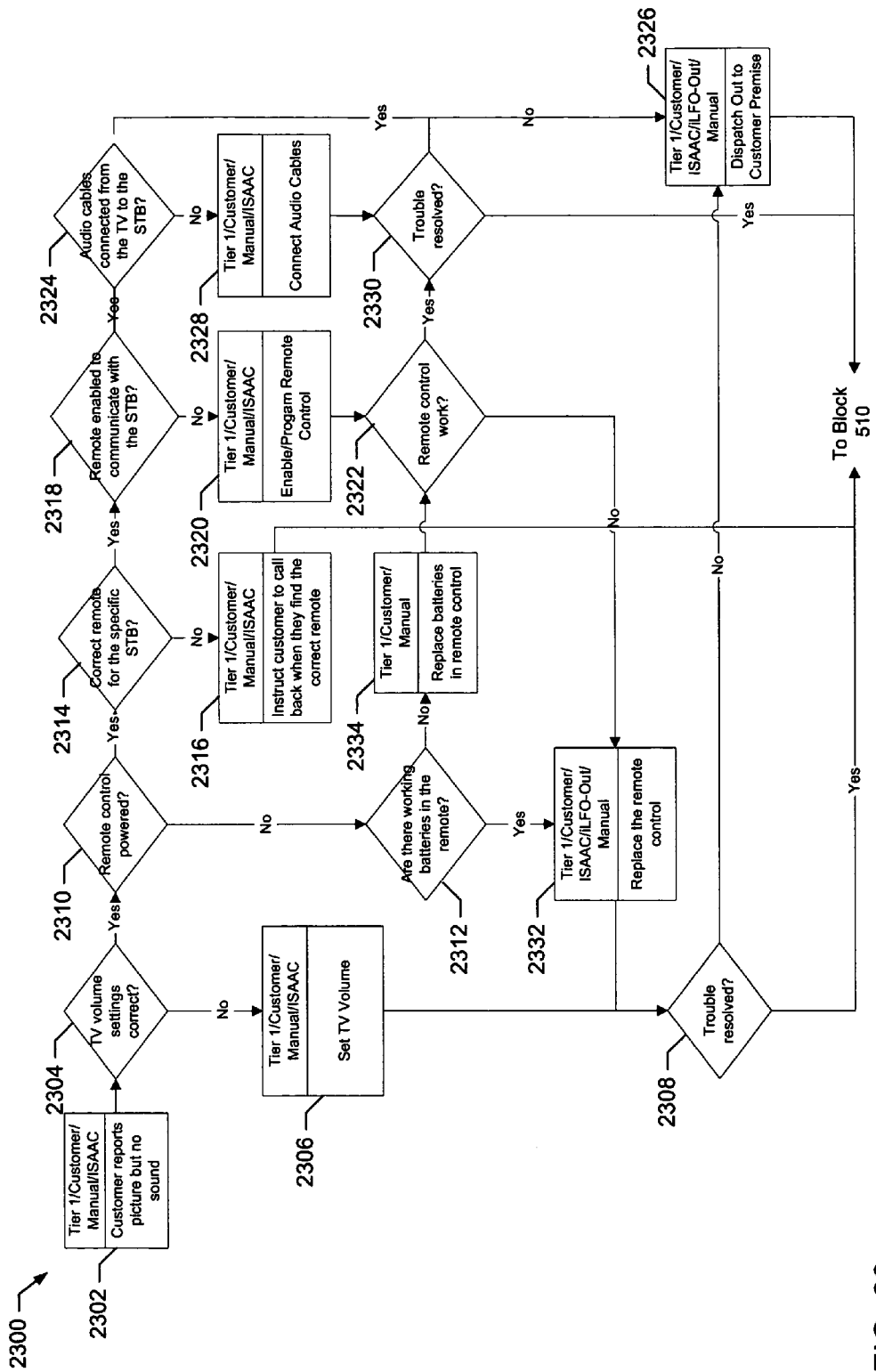

FIG. 23 is a flow diagram illustrating a process 2200 to determine if devices associated with the video service are functioning properly. Process 2200 may be performed after it is determined that the customer's problem relates only to video service in block 2004 of FIG. 20. Process 2200 is an alternative to process 2100. Process 2200 may be conducted when the customer's problem relates to audio problems with the video service.

The agent or the ISAAC server asks the customer to verify that they are receiving a picture but no sound on their television or other video presentation device (block 2302). The agent or the ISAAC server then instructs the customer to verify that the television volume setting on the television is correct (block 2304). If the television volume setting is not correct, the agent or the ISAAC instructs the customer to set the television volume correctly (block 2306). Control then proceeds to block 2308. If the television volume setting is correct, the agent or the ISAAC server asks the customer if the remote control has power (block 2310). If the remote control does not have power, control proceeds to block 2312.

If the remote control has power, the agent or the ISAAC server instructs the customer in determining if the customer has the correct remote control for the STB that the customer is attempting to control (block 2314). If the customer has the incorrect remote control for the STB, the agent or the ISAAC server instructs the customer to call back after locating the correct remote control (block 2316). Control then proceeds to block 510 of FIG. 5. If the customer has the correct remote control for the STB, the agent or the ISAAC server instructs the customer to determine if the remote control is programmed to operate the STB (block 2318). If the remote control is not programmed to operate the STB, the agent or the ISAAC server instructs the customer in programming the remote control for the STB (block 2320) and control proceeds to block 2322.

If the remote control is programmed to operate the STB, the agent or the ISAAC server instructs the customer in determining if the audio cables are properly connected from the STB to the television (block 2324). If the audio cables are connected properly, the agent or the ISAAC server requests that a technician from the LFO be dispatched to the customer location (block 2326) and control proceeds to block 510 of FIG. 5.

If the audio cables are not connected properly, the agent or the ISAAC server instructs the customer to properly connect the audio cables. The agent or the ISAAC server then asks the customer if the problem has been resolved (block 2330). If the problem has been resolved, control proceeds to block 510 of FIG. 5. If the problem has not been resolved, control proceeds to block 2326, which has been previously described.

Returning to block 2308, after instructing the customer to correctly set the television volume, the agent or the ISAAC server asks the customer if the problem has been resolved (block 2308). If the problem has been resolved, control proceeds to block 510 of FIG. 5. If the problem has not been resolved, control proceeds to block 2326, which has been previously described.

Returning to block 2312, after determining that the remote control does not have power, the agent or the ISAAC server asks the customer if there are working batteries installed in the remote control (block 2312). If there are working batteries installed in the remote control, the agent or the ISAAC server requests that a new remote control be shipped or delivered to the customer (block 2332) and control proceeds to block 2308.

If there are not working batteries installed in the remote, the agent or the ISAAC server instructs the customer to insert working batteries in the remote control (block 2334). Control then proceeds to block 2322.

Returning to block 2322, after inserting working batteries in the remote control or programming the remote control, the agent or the ISAAC server asks the customer if the remote control is working properly (block 2322). If the remote control is working properly, control proceeds to block 2330, which has been previously described. If the remote control is not working properly, control proceeds to block 2332.

Figure 24:
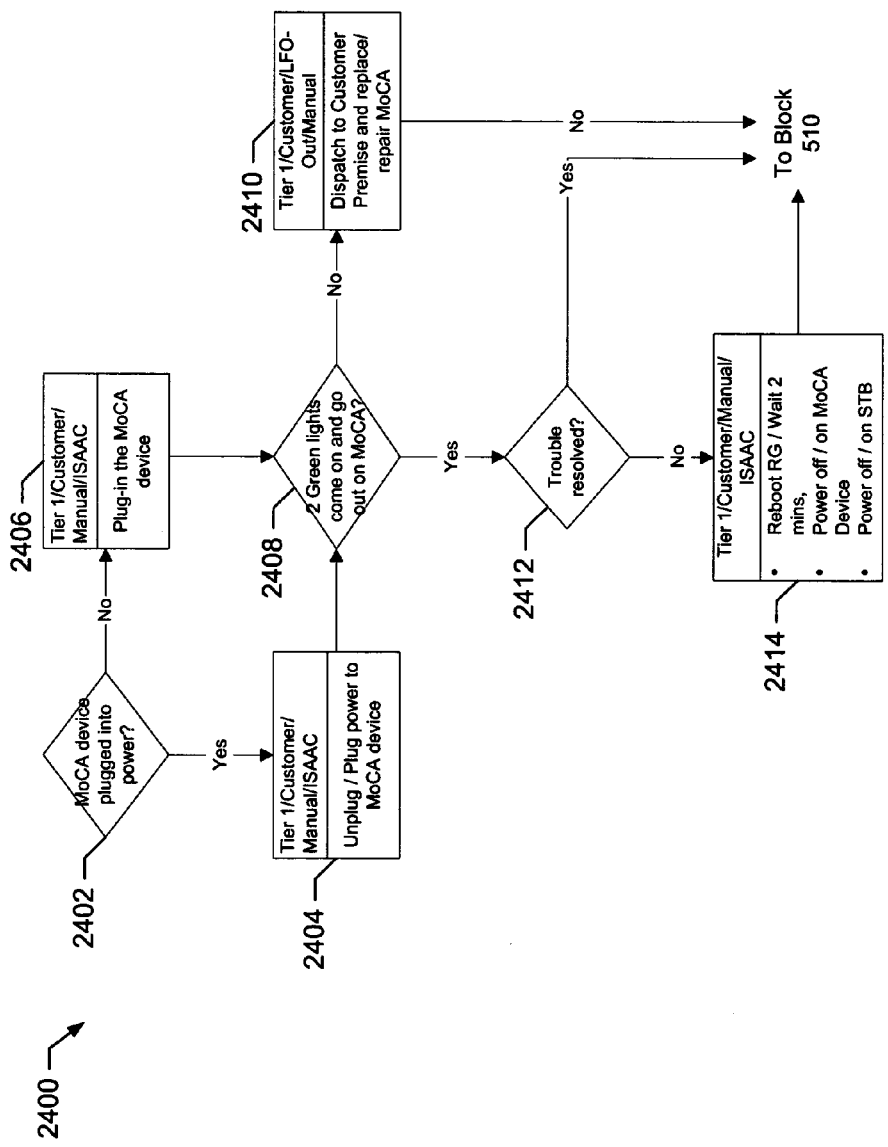

FIG. 24 is a flow diagram illustrating a process 2400 to determine if an installed MoCA device is functioning properly. The process 2400 may be performed after it is determined that a MoCA device is installed at a customer location in block 2222 of FIG. 22. The agent or the ISAAC server asks the customer if the MoCA device is plugged into an outlet (block 2402). If the device is plugged in, the agent or the ISAAC server instructs the customer to power cycle the MoCA device (block 2404). Control then proceeds to block 2408. If the device is not plugged in, the agent or the ISAAC server instructs the customer to plug in the MoCA device (block 2406). Control then proceeds to block 2408.

After the MoCA device has been power cycled or plugged in, the agent or the ISAAC server asks the customer if two green lights are illuminated and then darkened (block 2408). If the two green lights are not illuminated and then darkened, the agent or the ISAAC server requests that a technician be dispatched to the customer's location to replace the MoCA device (block 2410) and control proceeds to block 510 of FIG. 5.

If the two green lights are illuminated and then darkened, the agent or the ISAAC server asks the customer whether the trouble has been resolved (block 2412). If the problem has been resolved, control proceeds to block 510 of FIG. 5. If the problem has not been resolved, the agent or the ISAAC server instructs the customer to reboot the residential gateway at the customer's location, power cycle the MoCA device, and power cycle the STB at the customer's location (block 2414). Control then proceeds to block 510 of FIG. 5.

Figure 25:
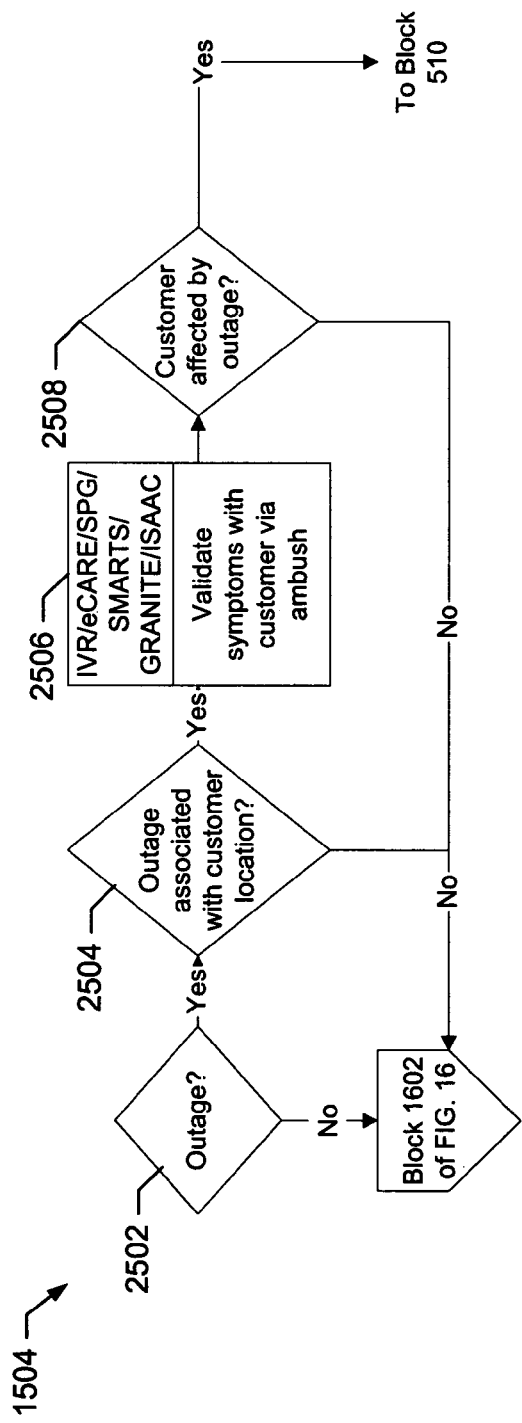

FIG. 25 is a detailed flow diagram of process 1504 for implementing block 1504 of FIG. 15 for checking for network outages. Process 1504 begins by determining if there is a known network outage (block 2502). If there are not any known network outages, control proceeds to block 1602 of FIG. 16. If there is a known network outage, the agent or the ISAAC determines if the outage affects the customer's location (block 2504). If the outage does not affect the customer's location, control proceeds to block 1602 of FIG. 16. If the outage does affect the customer's location, the agent, the ISAAC, the eCare server, or the ISAAC server analyzes available data to determine if the customer's problem coincides with the symptoms related to the network outage (block 2506). For example, the ISAAC server may analyze network inventory data from the Granite database or may retrieve data from the SPG tool or the SMARTS tool to determine if the outage affects the problem that the customer is experiencing. The agent or the ISAAC server then determines if the customer is affected by the outage (block 2508). If the customer is not affected by the outage, control proceeds to block 1602 of FIG. 16 for further troubleshooting. If the customer is affected by the network outage, control proceeds to block 510 of FIG. 5 to report the outage to the customer.

Figure 26:
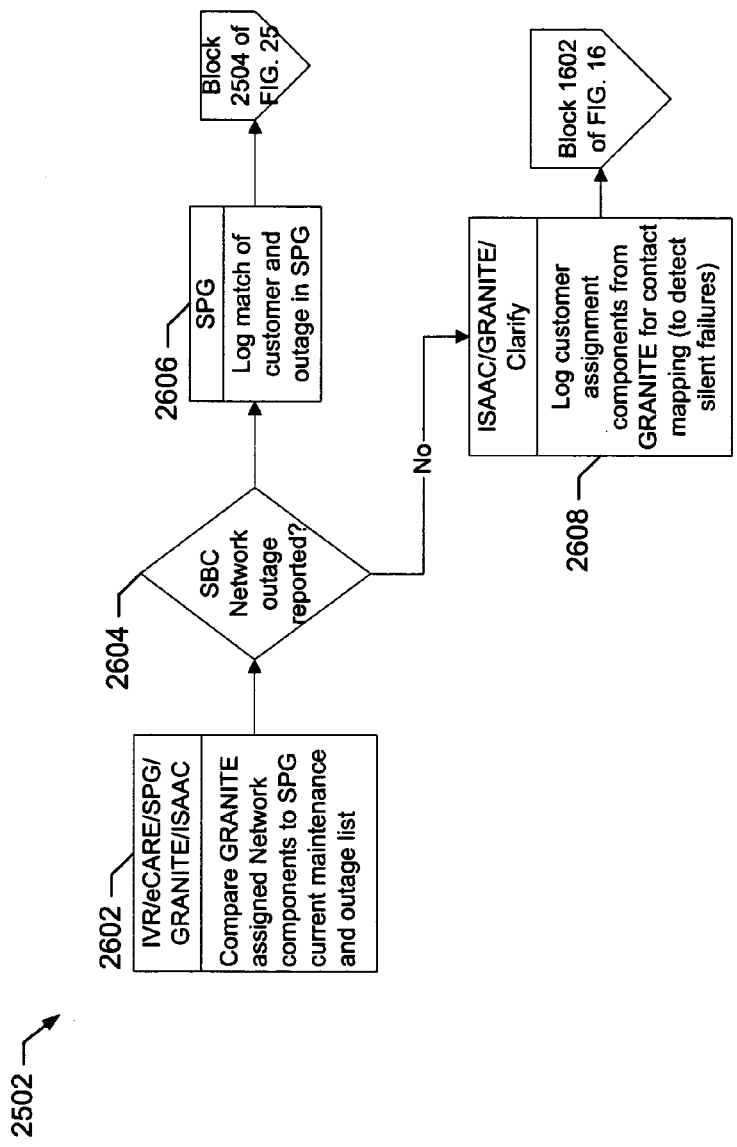

FIG. 26 is a detailed flow diagram of a process 2502 for implementing block 2502 of FIG. 25. The agent or the ISAAC server retrieves information about network components associated with the customer from a Granite server (i.e., using the Clarify interface 455) and network components currently marked as experiencing an outage from an SPG tool (i.e., using the SPG/NCC interface 444) and compares the lists of retrieved network components (block 2602). The agent or the ISAAC server determines if network components in the list from the Granite serve match network components in the list from the SPG tool (block 2604). If any network components match, the SPG tool adds an entry to a log indicating that the customer is experiencing an outage (block 2606) and control proceeds to block 2504 of FIG. 25. If no network components match, the Granite server adds an entry to a log indicating that, while no network components for the customer are currently listed as experiencing an outage, the customer is experiencing trouble with the service (block 2608). The log entry can be used to detect network outages. For example, if a network component is logged several times, it may indicate that the network component is experiencing and outage that is, thus far, unknown. Control then proceeds to block 1602 of FIG. 16.

Figure 27:
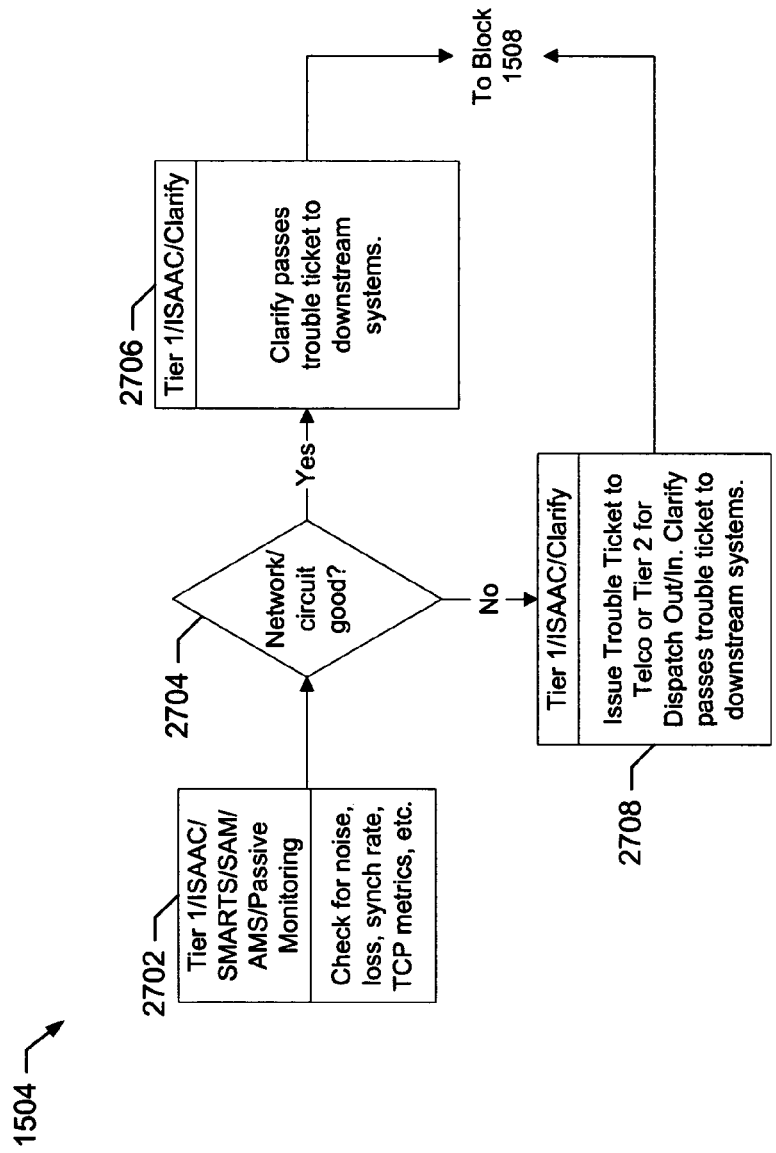

FIG. 27 is a detailed flow diagram of process 1504 for implementing block 1504 of FIG. 15 checking network and/or circuit performance. The agent or the ISAAC server uses a Smarts interface (e.g., EMC Smarts interface 446), an Alcatel 5620 SAM interface (e.g., Alcatel 5620 SAM interface 440), an Alcatel 5526 AMS element manager interface (e.g., Alcatel 5526 AMS element manager interface 436), and/or a passive monitoring interface (e.g., passive monitoring interface 442) to look for problems on the network or connection circuit (block 2702). For example, the agent or the ISAAC server may check for noise on a connection, signal loss on a connection, packet loss on a connection, synchronization rate errors, improper TCP metrics, etc. The agent or the ISAAC determines if the network or the circuit are functioning (block 2704). If the network and the circuit are functioning, a Clarify server (e.g., a Clarify server accessible via the Clarify interface 455) passes on a trouble ticket for the customer and control proceeds to block 1508 of FIG. 15.

If the network or the circuit are not functioning properly, a trouble ticket is sent to the network or circuit provider indicating the problem or a technician is dispatched to troubleshoot the problem (block 2702). In addition, a trouble ticket for the customer is passed on and control proceeds to block 1508 of FIG. 15.

Figure 28:
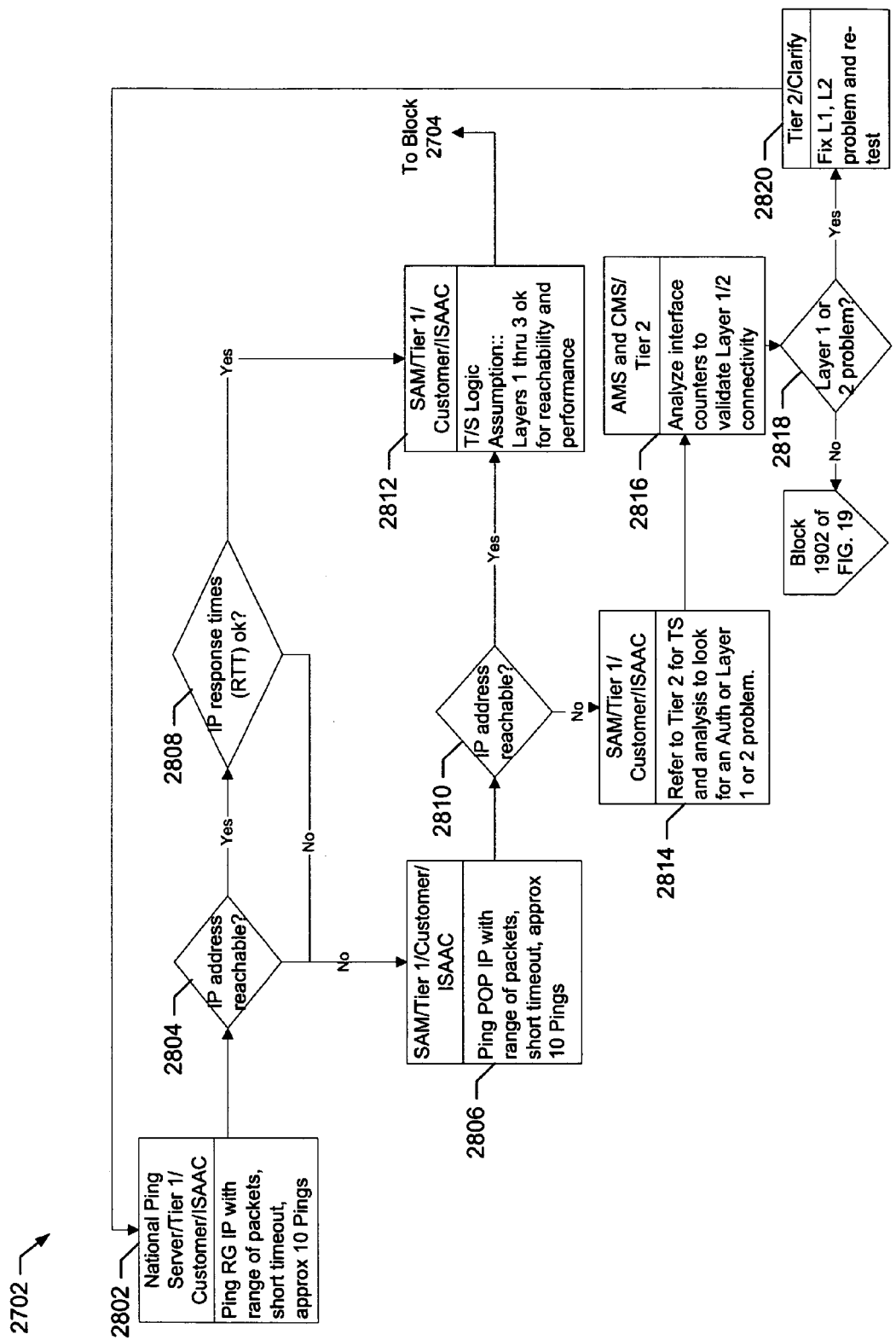

FIG. 28 is a detailed flow diagram of process 2702 for implementing block 2702 of FIG. 27 for performing tests on the network and/or circuit. Using a ping server the agent, the customer, or the ISAAC server sends one or more ping messages to the customer's residential gateway (block 2802). The agent, the customer, or the ISAAC server determines if the IP address was reachable by the ping messages (block 2804). If the IP address is not reachable, the agent, the customer, or the ISAAC server sends one or more ping messages to the IP address of the point of presence (POP) that the customer connects to (block 2806). Control then proceeds to block 2808.

If the IP address of the residential gateway is reachable, the agent or the ISAAC server determines if the ping response times are reasonable (e.g., within a specified range) (block 2808). If the ping response times are not reasonable, control proceeds to block 2806, which has been previously described. If the ping response times are reasonable, control proceeds to block 2812.

Returning to block 2808, the agent, the customer, or the ISAAC server determines if the IP address of the POP associated with the customer is reachable (block 2810). If the IP address of the POP associated with the customer is reachable, control proceeds to block 2812. If the IP address of the POP associated with the customer is not reachable, the contact is referred to a higher level support technician for further troubleshooting and analysis (block 2814). For example, the higher level support technician may look for an authentication problem or a problem with the connection to layer 1 or layer 2 of the network (block 2814). Control then proceeds to block 2816.

Returning to block 2812, after determining that the IP address of the POP associated with the customer is reachable, the agent, the customer, or the ISAAC server records that it is assumed that layer 1, layer 2, and layer 3 are functioning properly (block 2812). Control then proceeds to block 2704 of FIG. 27.

Returning to block 2816, after the contact has been routed to a higher level support technician, the agent or the ISAAC server uses an Alcatel 5526 AMS element manager interface (e.g., Alcatel© 5526 AMS element manager interface 436 of FIG. 4) and/or a CMS interface (e.g., CMS interface 432) to retrieve data about layer 1 and layer 2 of the service provider network (block 2816). The agent or the ISAAC server then determines based on the retrieved data if layer 1 and/or layer 2 of the network are functioning properly (block 2818). If layer 1 or layer 2 of the network are functioning properly, control proceeds to block 1902 of FIG. 19. If layer 1 and layer 2 of the network are functioning improperly, the agent or the ISAAC server repairs the problem and control returns to block 2802 to re-test the connection (block 2820).

Figure 29:
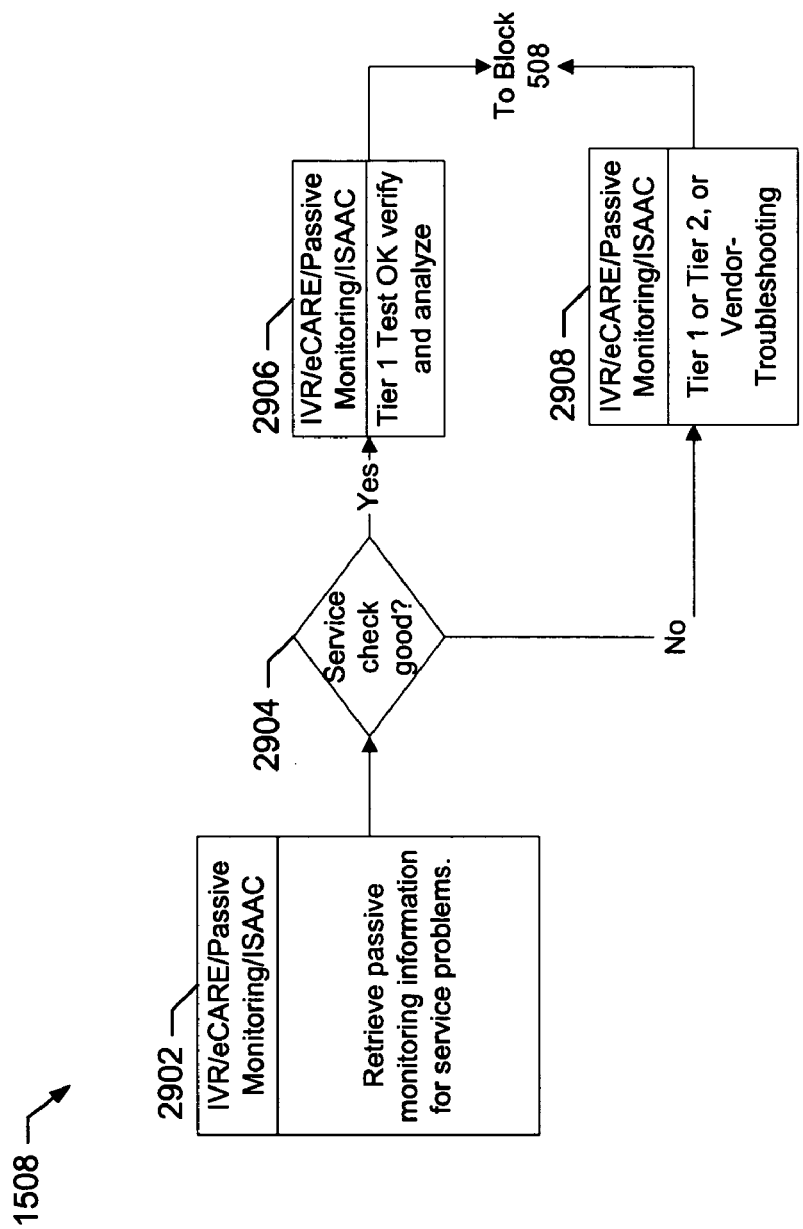

FIG. 29 is a detailed flow diagram of process 1508 for implementing block 1508 of FIG. 15 checking for data service (e.g., high speed internet service) performance. The ISAAC server uses a passive monitoring interface (e.g., passive monitoring interface 442) to retrieve information about the data service (block 2902). For example, the ISAAC server and the passive monitoring interface may retrieve a byte transfer rate; a bit transfer rate; metrics from a TCP layer; statistics about internet traffic; information about viruses, spyware, or worms; etc. The ISAAC server or the agent then determines if the retrieved data indicates that the data service is functioning properly (block 2904). If the data service is functioning properly, the ISAAC server or the agent records the test result (block 2906). Control then proceeds to block 508 of FIG. 5 for further testing. If the data service is not functioning properly, the agent or the ISAAC server records the test result and performs troubleshooting to resolve the data service problem (2908). In addition, the agent or the ISAAC server may contact a data service vendor to indicate a problem with their service. Control then proceeds to block 508 of FIG. 5.

Section III—Diagnose and Isolate (Block 508)

Figure 30:
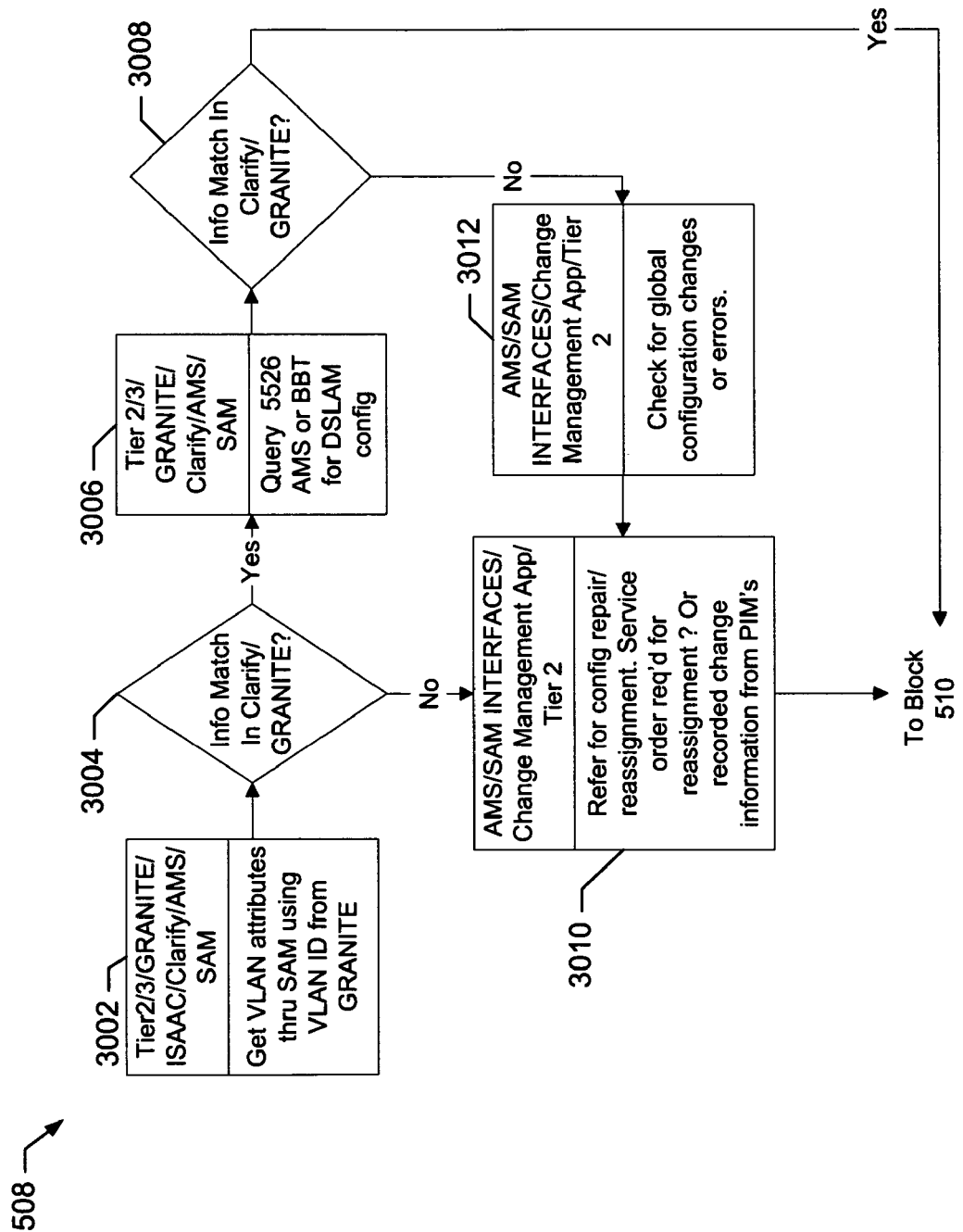

FIG. 30 is a detailed flow diagram of process 3002 to verify that a customer's equipment configuration is valid. Process 3002 may be performed after determining that the residential gateway is reachable in block 1308 of FIG. 13 or after determining that a port on the DSLAM is not functioning properly in block 1728 of FIG. 17. The agent or the ISAAC server obtains the identifier of the virtual LAN (VLAN) for the customer using a Granite database (e.g., using authentication interface 450 of FIG. 4) and obtains the attributes of that VLAN using an Alcatel 5620 SAM interface (e.g., the Alcatel 5620 SAM interface 440) (block 3002). The agent or the ISAAC then determines if the information about the VLAN stored in a Clarify database (e.g., a Clarify database accessed via the Clarify interface 455) matches the actual information obtained from the VLAN (block 3004). If the information matches, the agent or the ISAAC server retrieves the configuration of the DSLAM associated with the customer using an Alcatel 5526 AMS element manager interface (e.g., the Alcatel 5526 AMS element manager interface 436) or using a BBT interface (e.g., broadband tools accessed via the BBT interface 434). Control then proceeds to block 3008. If the information accessed via the Clarify interface does not match the actual information obtained from the VLAN, control proceeds to block 3010.

Turning to block 3008, the agent or the ISAAC server determines if the information in the Clarify data matches the information of the actual DSLAM (block 3008). If the information matches, control proceeds to block 510 of FIG. 5. If the information does not match, the agent or the ISAAC server uses any available interface to determine if the equipment configuration has been modified and/or whether any errors are present (block 3012). Control then proceeds to block 3010.

Returning to block 3010, after determining that the information in the Clarify database does not match the actual equipment configuration, the agent or the ISAAC server submits a request to have the problem repaired (block 3010). For example, the repair may include replacing equipment, troubleshooting equipment errors, etc. Control then proceeds to block 510 of FIG. 5.

Section IV—Report and Route (Block 510)

Figure 31:
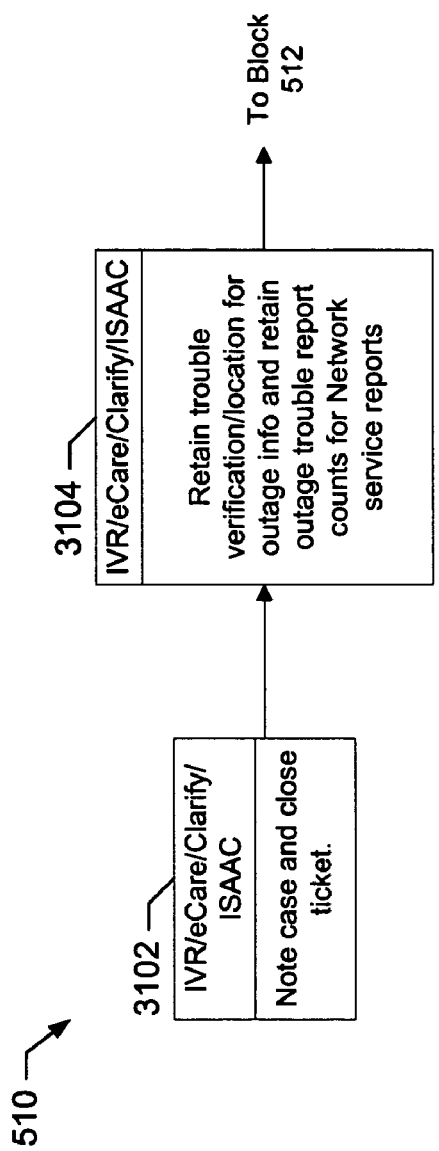

FIG. 31 is a detailed flow diagram of process 510 of FIG. 5 for reporting the results of the support process. The agent or the ISAAC server records notes indicating the result of the support process and closes the support ticket associated with the contact (block 3102). The agent or the ISAAC server then retains information about the support request for passive determination of network problems (block 3104). For example, the ISAAC server may store information about the customer's location in the network and problem using the state layer 422. If several customers contact the call center from a similar location and experience the same problem, the ISAAC server may determine that there is a problem with equipment near that location. Control then proceeds to block 512 of FIG. 5.

Section V—Update Customer (Block 512)

Figure 32:
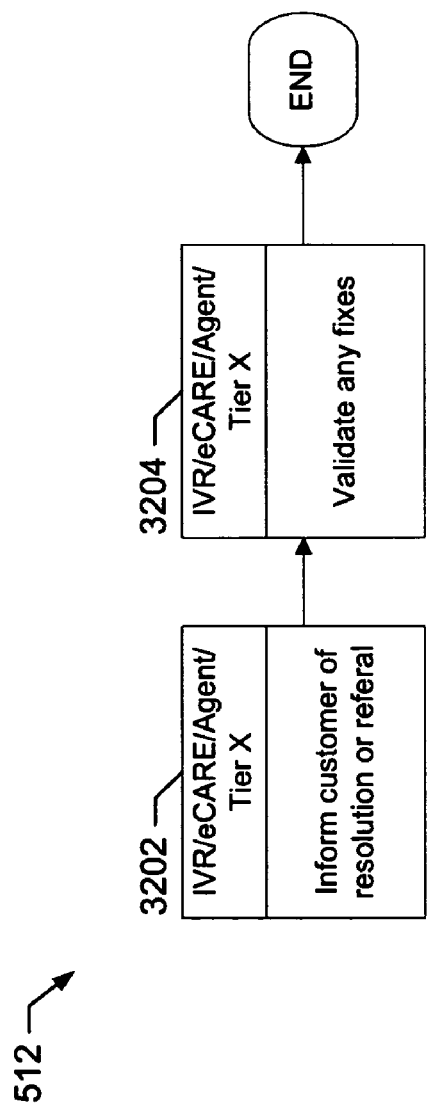

FIG. 32 is a detailed flow diagram of process 512 of FIG. 5 for updating the customer on the status of their support request. The agent or the ISAAC server may use an IVR interface (e.g., IVR interface 410), an eCare online interface (e.g., eCare online interface 412), an IPTV interface (e.g., IPTV interface 414), or any other available communication interface to notify the customer of the resolution of their problem and/or the routing of their request to another agent or entity (block 3202). For example, the ISAAC server may present a message via the IVR interface indicating that the problem cannot be resolved at this time, but an agent from another department will call the customer within the next hour.

After notifying the customer of the resolution of the contact, the agent or the ISAAC server instructs the customer to verify any fixes that were performed performing ending the customer contact (block 3204). For example, the agent may instruct the customer to verify that they can now access the internet via their computer and they can receive television content on their television.

Figure 33:
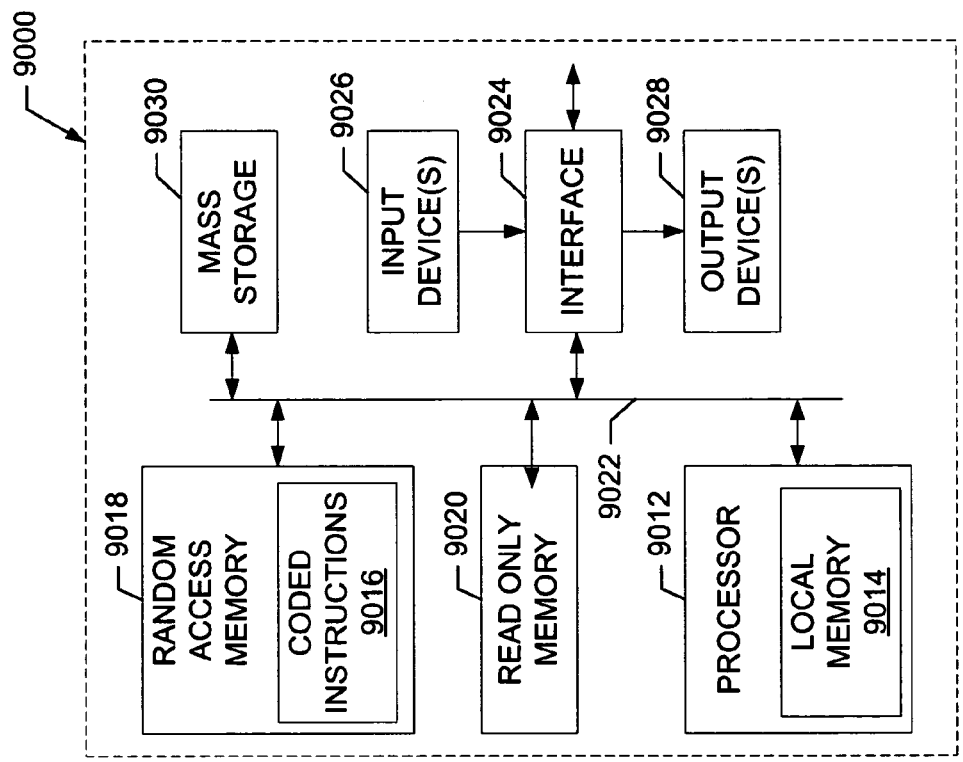
FIG. 33 is a block diagram of an example computer capable of performing some or all of the processes represented by FIGS. 5 and 32.

FIG. 33 is a block diagram of an example computer 9000 capable of performing some or all of the processes represented by FIGS. 5 and 32 to implement the apparatus and/or methods disclosed herein. The computer 9000 can be, for example, a server, a personal computer, a personal digital assistant (PDA), an Internet appliance, a set top box, or any other type of computing device.

The system 9000 of the instant example includes a processor 9012 such as a general purpose programmable processor. The processor 9012 includes a local memory 9014, and executes coded instructions 9016 present in the local memory 9014 and/or in another memory device. The processor 9012 may execute, among other things, the example machine readable instructions illustrated in FIGS. 5-32. The processor 9012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 9012 is in communication with a main memory including a volatile memory 9018 and a non-volatile memory 9020 via a bus 9022. The volatile memory 9018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 9020 may be implemented by flash memory and/or any other desired type of memory device. Access to the main memory 9018, 9020 is typically controlled by a memory controller (not shown) in a conventional manner.

The computer 9000 also includes a conventional interface circuit 9024. The interface circuit 9024 may be implemented by any type of well known interface standard, such as an Ethernet interface, a universal serial bus (USB), and/or a third generation input/output (3GIO) interface.

One or more input devices 9026 are connected to the interface circuit 9024. The input device(s) 9026 permit a user to enter data and commands into the processor 9012. The input device(s) can be implemented by, for example, a keyboard, a mouse, a touchscreen, a track-pad, a trackball, isopoint and/or a voice recognition system.

One or more output devices 9028 are also connected to the interface circuit 9024. The output devices 9028 can be implemented, for example, by display devices (e.g., a liquid crystal display, a cathode ray tube display (CRT), a printer and/or speakers). The interface circuit 9024, thus, typically includes a graphics driver card.

The interface circuit 9024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 9000 also includes one or more mass storage devices 9030 for storing software and data. Examples of such mass storage devices 9030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Further, while the forgoing describes systems and processes for providing support to customers of a telecommunications provider, persons of ordinary skill in the art will recognize that the forgoing systems and processes may be used to provide support to customers of any type of business. For example, the forgoing systems and processes may be used to provide support to customers of a credit card distributor, an electronics manufacturer, a cable television and/or internet provider, a satellite television and/or internet provider, a computer manufacturer or retailer, a cellular phone service provider, a bank, a securities brokerage business, an internet retailer, etc.

This patent contemplate examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for handling contacts to a support center, the method comprising:
receiving in a telecommunication system, a first contact from a first customer;
receiving in the telecommunication system, a first identifier associated with the first customer;
determining via a processor, a communication device associated with the first customer based on the first contact from the first customer;
initiating, via the processor, transmission of a test query to the communication device to determine a communication issue;
retrieving, via the processor, contact details for a second contact associated with a second identifier associated with a second customer and comparing the contact details to a response to the test query to determine if a communication issue associated with the first identifier exists; and
indicating, via the processor, that the communication issue associated with the first identifier exists if the contact details for the second contact associated with the second identifier indicate that the communication issue associated with the first identifier exists.

2. A method as defined in claim 1, further comprising determining if the communication issue associated with the first identifier is known.

3. A method as defined in claim 1, further comprising contacting a device associated with the support center to determine if the communication issue associated with the first identifier exists.

4. A method as defined in claim 1, further comprising routing the first contact to a support center agent if the contact details for the contact associated with the second identifier do not indicate that the communication issue associated with the first identifier exists.

5. A method as defined in claim 4, further comprising:
determining which of a first agent or a second agent is capable of handling the first contact; and
routing the first contact to the support agent that is capable of handling the first contact.

6. A method as defined in claim 4, further comprising generating a script that the support center agent can follow based on at least one of the first identifier or the communication issue.

7. A method as defined in claim 6, further comprising:
receiving information from the first customer; and
modifying the script based on the information.

8. A method as defined in claim 6, further comprising retrieving a business rule to generate the script.

9. A method as defined in claim 1, further comprising automatically generating a support script associated with the communication issue.

10. A method as defined in claim 1, further comprising analyzing a plurality of contact details to determine if the communication issue associated with the first identifier exists.

11. A method as defined in claim 10, wherein analyzing the plurality of contact details comprises determining if the number of contacts having the same reason for contacting the support center as the first reason that the first customer is contacting the support center exceeds a threshold.

12. A method as defined in claim 11, further comprising determining if at least one of the plurality of contacts and the first customer require access to a same network device.

13. A method as defined in claim 1, further comprising:
diagnosing, via the processor, a solution to the communication issue based on the response to the test query; and
testing a network component to determine the communication issue if the communication issue is not determined by testing the communication device.

14. A method as defined in claim 13, wherein testing the network component comprises determining if at least one of a digital subscriber line access multiplexer, a plain old telephone service splitter, or a plain old telephone service switch is communicatively coupled to customer premise equipment associated with the customer.

15. A method as defined in claim 14, wherein testing the network component comprises determining if the digital subscriber line access multiplexer provides data service to the customer premise equipment.

16. A method as defined in claim 13, further comprising upon diagnosing the solution, routing the contact to a support center agent associated with at least one of the communication issue or the solution.

17. A method as defined in claim 1, wherein the test query is to test the communication device by determining if at least one of a residential gateway associated with the customer, a customer premise equipment associated with the customer or a local area network associated with the customer is communicatively coupled to the processor.

18. A method as defined in claim 1, wherein the contact is made via at least one of voice communications or data communications.

19. A tangible article of manufacture storing machine readable instructions which, when executed, cause a machine to:
   receive a contact from a customer in a telecommunication system;
   determine a residential gateway associated with the customer based on the contact from the customer;
   transmit a first test query to the residential gateway;
   determine if the residential gateway responds to the first test query;
   transmit a second test query to a digital subscriber line access multiplexer when the residential gateway does not respond to the first test query;
   determine if the digital subscriber line access multiplexer responds to the second test query; and
   route the contact based on at least one of a response to the first test query or a response to the second test query.

20. A tangible article of manufacture as defined in claim 19, wherein the machine readable instructions, when executed, further cause the machine to test the digital subscriber line access multiplexer by determining if the digital subscriber line access multiplexer provides data service to the residential gateway.

21. A tangible article of manufacture as defined in claim 19, wherein the machine readable instructions, when executed, further cause the machine to:
   transmit a third test query to at least one of a plain old telephone service splitter or a plain old telephone service switch;
   determine if at least one of the plain old telephone service splitter or the plain old telephone service switch responds to the third test query; and
   route the contact based on a response to the third test query.

22. A tangible article of manufacture as defined in claim 19, wherein the machine readable instructions, when executed, further cause the machine to:
   transmit a fourth test query at least one of a customer premise equipment associated with the customer or a local area network associated with the customer;
   determine if at least one of the customer premise equipment or the local area network responds to the fourth test query; and
   route the contact based on a response to the fourth test query.

23. A tangible article of manufacture as defined in claim 19, wherein the machine readable instructions, when executed, further cause the machine to route the contact to a support center agent based on at least one of the response to the first test query or the response to the second test query.

24. A tangible article of manufacture as defined in claim 23, wherein the machine readable instructions, when executed, further cause the machine to generate a script that the support center agent can follow based on at least one of the response to the first test query or the response to the second test query.

25. A tangible article of manufacture as defined in claim 24, wherein the machine readable instructions, when executed, further cause the machine to:
   receive information from the customer; and
   modify the script based on the information.

26. A tangible article of manufacture as defined in claim 24, wherein the machine readable instructions, when executed, further cause the machine to retrieve a business rule to generate the script.

27. A tangible article of manufacture as defined in claim 19, wherein the machine readable instructions, when executed, further cause the machine to route the contact to a support center agent if an issue is not determined by at least one of the response to the first test query or the response to the second test query.

28. A tangible article of manufacture as defined in claim 19, wherein the machine readable instructions, when executed, further cause the machine to automatically generate a support script associated with at least one of the response to the first test query or the response to the second test query.

* * * * *